United States Patent [19]
Ishida et al.

[11] Patent Number: 5,642,281
[45] Date of Patent: Jun. 24, 1997

[54] STEERING ANGLE CONTROL APPARATUS

[75] Inventors: Akira Ishida, Sakai; Takashi Fukunaga, Hirakata; Akiyoshi Segawa, Osaka, all of Japan

[73] Assignee: Matsushita Electric Industrial Co., Ltd., Osaka, Japan

[21] Appl. No.: 372,309

[22] Filed: Jan. 13, 1995

[30] Foreign Application Priority Data

Jan. 14, 1994 [JP] Japan ................... 6-002435
Jun. 21, 1994 [JP] Japan ................... 6-138988

[51] Int. Cl.$^6$ .................................. B62D 6/00
[52] U.S. Cl. .................. 364/424.051; 180/410; 180/412; 180/422; 280/91.1
[58] Field of Search ............ 364/424.05; 280/91.1; 180/408, 410, 412, 413, 414, 421–423

[56] References Cited

U.S. PATENT DOCUMENTS

| | | | |
|---|---|---|---|
| 4,690,431 | 9/1987 | Ito et al. | 280/91 |
| 4,720,790 | 1/1988 | Miki et al. | 364/424.05 |
| 4,934,474 | 6/1990 | Sugasawa | 364/424.05 |
| 4,998,201 | 3/1991 | Mori | 280/91 |
| 5,267,160 | 11/1993 | Ito et al. | 364/424.05 |
| 5,274,555 | 12/1993 | Fukunaga et al. | 364/424.05 |
| 5,285,390 | 2/1994 | Haseda et al. | 364/424.05 |
| 5,448,481 | 9/1995 | Asanuma et al. | 364/424.05 |
| 5,502,639 | 3/1996 | Fukunaga et al. | 364/424.05 |

FOREIGN PATENT DOCUMENTS

| | | |
|---|---|---|
| 0346178 | 12/1989 | European Pat. Off. . |
| 0353995 | 2/1990 | European Pat. Off. . |
| 0460581 | 12/1991 | European Pat. Off. . |
| 0471299 | 2/1992 | European Pat. Off. . |
| 0551891 | 7/1993 | European Pat. Off. . |
| 3532222 | 3/1986 | Germany . |
| 3905811 | 9/1989 | Germany . |
| 60-124572 | 7/1985 | Japan . |
| 2-151568 | 6/1990 | Japan . |
| 2-151569 | 6/1990 | Japan . |
| 2-151570 | 6/1990 | Japan . |
| 2-151571 | 6/1990 | Japan . |
| 3-164374 | 7/1991 | Japan . |

OTHER PUBLICATIONS

Patent Abstracts of Japan, vol. 14, No. 309 (P–1071) 4 Jul. 1990.

*Primary Examiner*—Gary Chin
*Attorney, Agent, or Firm*—Wenderoth, Lind & Ponack

[57] ABSTRACT

A steering angle control apparatus for controlling steering angles of front wheels and rear wheels of a vehicle includes a yaw rate detector for detecting an actual yaw rate of the vehicle. A desired yaw rate calculator estimates a desired yaw rate for causing the vehicle to drive stably. A yaw rate disturbance calculator calculates a yaw rate disturbance which causes the detected yaw rate to deviate from an ideal yaw rate of the vehicle assuming driving in ideal driving conditions. A desired yaw rate compensator compensates the desired yaw rate based on the calculated yaw rate disturbance and produces a compensated yaw rate so that the desired yaw rate tracks the compensated yaw rate.

13 Claims, 21 Drawing Sheets

STEERING ANGLE CONTROL APPARATUS

BACKGROUND OF THE INVENTION

1. Field of the Invention

The present invention relates to a steering angle control apparatus for steering the vehicle wheels according to the steering wheel angle, vehicle speed, vehicle yaw rate, and rear wheel steering angle of the automobile or other vehicle.

2. Description of the Prior Art

Numerous four-wheel steering control apparatuses have been proposed for improving the steering stability of a vehicle in motion. With the apparatus disclosed in Japanese Laid-open Patent Publication No. H3-164374 (unexamined) published Jul. 16, 1991, for example, the steering wheel angle is detected by means of a steering wheel angle sensor. The actual yaw rate (the rotational angle velocity around the vehicle's center of gravity as seen from above) is detected by means of a yaw rate sensor. The steering speed of the front wheels is multiplied by the amount of steering control applied in the direction constraining the yaw rate (the yaw rate constraining direction). The amount of steering control applied in the yaw rate constraining direction is then adjusted according to the steering speed, thereby reducing the amount of steering control applied in the yaw rate constraining direction of the rear wheels, which are in steady rotation, and improving the initial turning response when the front wheels are suddenly turned.

The yaw rate tracking control method proposed in Japanese Laid-open Patent Publication No. 60-124572 (unexamined) published Jul. 3, 1985, for example, calculates a target yaw rate from the steering wheel angle and vehicle speed, and steers the rear wheels so that the actual yaw rate tracks the target yaw rate.

By using yaw rate feedback, both of these methods provide the advantage of being able to compensate for deviations in the orientation and line of travel of the vehicle due to external disturbances such as cross winds and poor road conditions by steering the rear wheels.

However, when drift affects the output of the yaw rate sensor, yaw rate sensor output deviates from the actual yaw rate by the amount of drift. As a result, the steering angle of the rear wheels may be erroneously changed, even though the vehicle is travelling straight and the front steering angle is zero degrees, because of a false yaw rate sensor output.

When the road surface is inclined on curves (banked) or straight roads (canted), gravity is a steady disturbance affecting the motion characteristics of the vehicle, and the vehicle behaves differently than when on flat roads.

More specifically, when moving through a bank, the yaw rate remains constant irrespective of the steering wheel angle if the vehicle speed remains constant.

When travelling on a canted surface, the front wheels must be turned at an angle merely to maintain a straight line of travel.

If a target value achieving a vehicle sideslip angle of zero on a flat road is determined from the vehicle speed and steering wheel angle, and the wheels are controlled using a yaw rate tracking control method that tracks this angle, the following phenomena resulting in a sense of instability occur.

On banks, the target yaw rate obtained from the steering wheel angle will differ from the yaw rate needed to travel in a stable manner through a bank.

However, because this control method tracks the actual yaw rate to the target yaw rate, the yaw rate of the vehicle does not match the yaw rate required for the bank, and the driver must steer to compensate for the difference.

On canted roads, the target yaw rate is calculated to be in the direction in which the steering wheel is turned, and the rear wheels are turned to track the actual yaw rate to the target.

However, because the front wheels must be turned for the vehicle to travel in a straight line on a canted road, this turning of the rear wheels hinders driving in a straight line, and the driver must again steer to compensate for the difference.

In FIG. 22, one example of the conventional steering angle control apparatus described above, applied in a vehicle V having front wheels 20 and rear wheels 29, is schematically shown. The steering angle control apparatus includes a vehicle speed detector 11, a steering angle detector 12, a yaw rate detector 13, a desirable yaw rate calculator 14, a desirable steering angle calculator 17, and a rear wheel steering device 40. The desirable yaw rate calculator 14 calculates a target yaw rate and produces a desirable yaw rate signal SYm for the vehicle Vc based on a speed signal Sv obtained by the vehicle speed detector 11, and a steering angle signal Ss obtained by the steering angle detector 12. The desirable steering angle calculator 17 calculates a desirable real wheel steering angle for the rear wheel and produces a desirable rear wheel steering angle signal θr based on the desirable yaw rate signal Sym. According to thus obtained desirable rear wheel steering angle signal θr, the rear wheel steering device 40 steers the rear wheels 19.

As a result, due to the effects of sensor drift and gravity, steady disturbances that are undesirable when calculating the rear wheel steering control tend to bias the detected yaw rate, and must therefore be removed.

SUMMARY OF THE INVENTION

The present invention has been developed with a view to substantially solving the above described disadvantages and has for its essential object to provide an improved steering angle control apparatus.

In order to achieve the aforementioned objective, a steering angle control apparatus for controlling steering angles of front wheels and rear wheels of a vehicle comprises a yaw rate detection means for detecting a first yaw rate occurring in said vehicle; a first yaw rate estimation means for determining a second yaw rate whereby said vehicle drives stably under an unbound driving condition; a disturbance estimation means for determining a yaw rate disturbance causing said first yaw rate to deviate from an ideal yaw rate occurring in said vehicle which is driving an unbound driving condition; and a yaw rate compensation means for compensating said second yaw rate based on said yaw rate disturbance to produce a third yaw rate whereby said vehicle drives stably even with said yaw rate disturbance.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 21C:
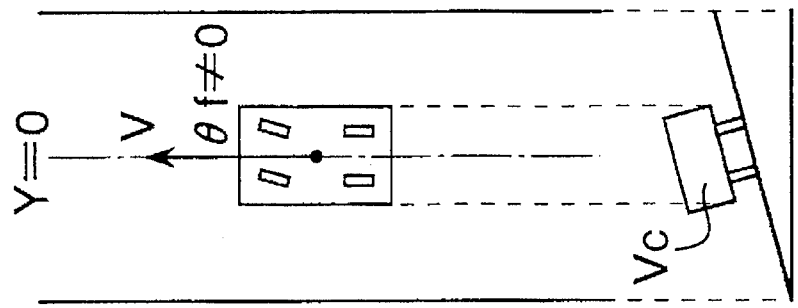
Figure 21B:
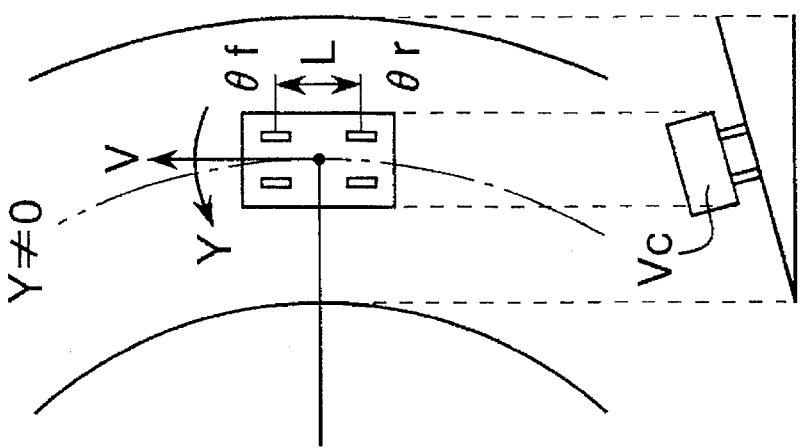
Figure 21A:
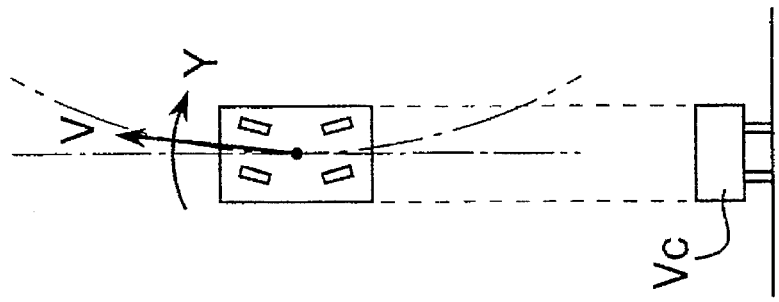
Figure 22:
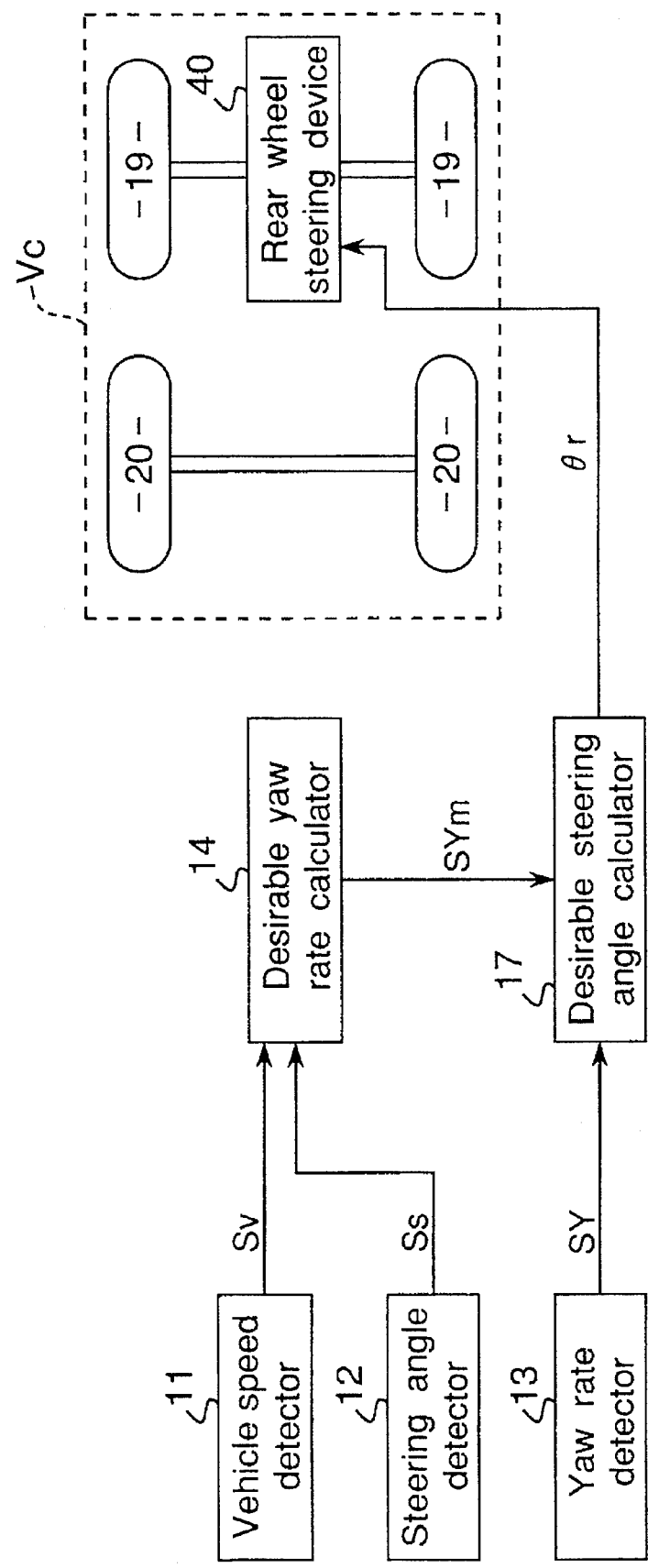
FIG. 22 is a block diagram of a conventional steering angle control apparatus.

Referring to FIGS. 21A, 21B, and 21C, vehicles driving on the roads with various surface conditions are shown. In FIG. 21A, the vehicle Vc drives on the road having a flat and level surface without any external force other than the basic external forces such as gravity, aerial resistance, mechanical resistance, or frictional resistance applied thereto. In other words, the vehicle Vc travels under an unbound driving condition. When the steering wheel of the vehicle Vc is turned at a certain angle during driving under the unbound condition, a force acts on the vehicle Vc so that the vehicle Vc yaws or moves in a curved line. An angular velocity of the yawing vehicle Vc per second is defined as a yaw rate Ya. It is to be noted that the yaw rate Ya occurring in the vehicle Vc driving under the unbound driving condition is referred to as a reference yaw rate Yh. However, when the vehicle Vc is not subject to external disturbing factors such as cross winds and poor road conditions by steering the rear wheels, the yaw rate Y actually detected deviates from the reference yaw rate Yh due to internal disturbing factor such as drift of the sensor(s) used to detect the yaw rate effecting in the vehicle.

In FIG. 21B, the vehicles Vc travelling on the banked road whose surface is inclined on curves (hereinafter referred to as "a bank") is shown. In FIG. 21C, the vehicle traveling a canted road whose surface is inclined but straight (hereinafter referred to as "a cant") is shown. When driving both on the banked roads and the canted roads, gravity is a steady disturbance affecting the motion characteristics of the vehicle Vc (yaw rate Ya) and the vehicle Vc behaves differently than when on flat and level roads (FIG. 21A). Thus, the vehicle Vc is driving under the bound but steady driving condition where the internal and external disturbing factors described above steadily effect on the vehicle so that the actually detected yaw rate Y deviates from the reference yaw rate. The disturbance of yaw rate due to these steadily disturbing factors is referred to as "steady disturbance".

Also, when the vehicle Vc is driving under a non-steady driving condition where driving condition changes suddenly or shakily due to such as a sudden cross wind, sudden turning of the steering wheel, and sudden change of the road condition, the detected yaw rate Y also deviates from the reference yaw rate more than when under the steady disturbance. The disturbance of yaw rate due these sudden changes of driving condition is referred to as "sudden disturbance."

If the road in FIG. 21A is flat, the reference yaw rate Yh should be Yh=0 and values of steering angles of front wheels $\theta f$ and rear wheels $\theta r$ are both zero, but the absolute value of the yaw rate Ya is greater than Yh=0 (|Ya|>Yh=0), and the vehicle is known to be travelling on a banked surface.

Similarly in FIG. 21B, Yh∝V/L·$\theta f$, and the vehicle is known to be travelling on a banked surface if the deviation from the actual yaw rate Y is |Y−Yh|> a predetermined value "Z".

The same is true when the vehicle is travelling on a straight road with cant (FIG. 21C).

Because the vehicle travels in a straight line in this case when the steering wheel is turned, the actual yaw rate Ya=0, but on a flat road Yh∝V/L·$\theta f$ should occur.

To summarize the above, the vehicle is known to be travelling on a banked or canted surface if |Y−Yh|>Z during steady conditions.

First embodiment

Figure 1:
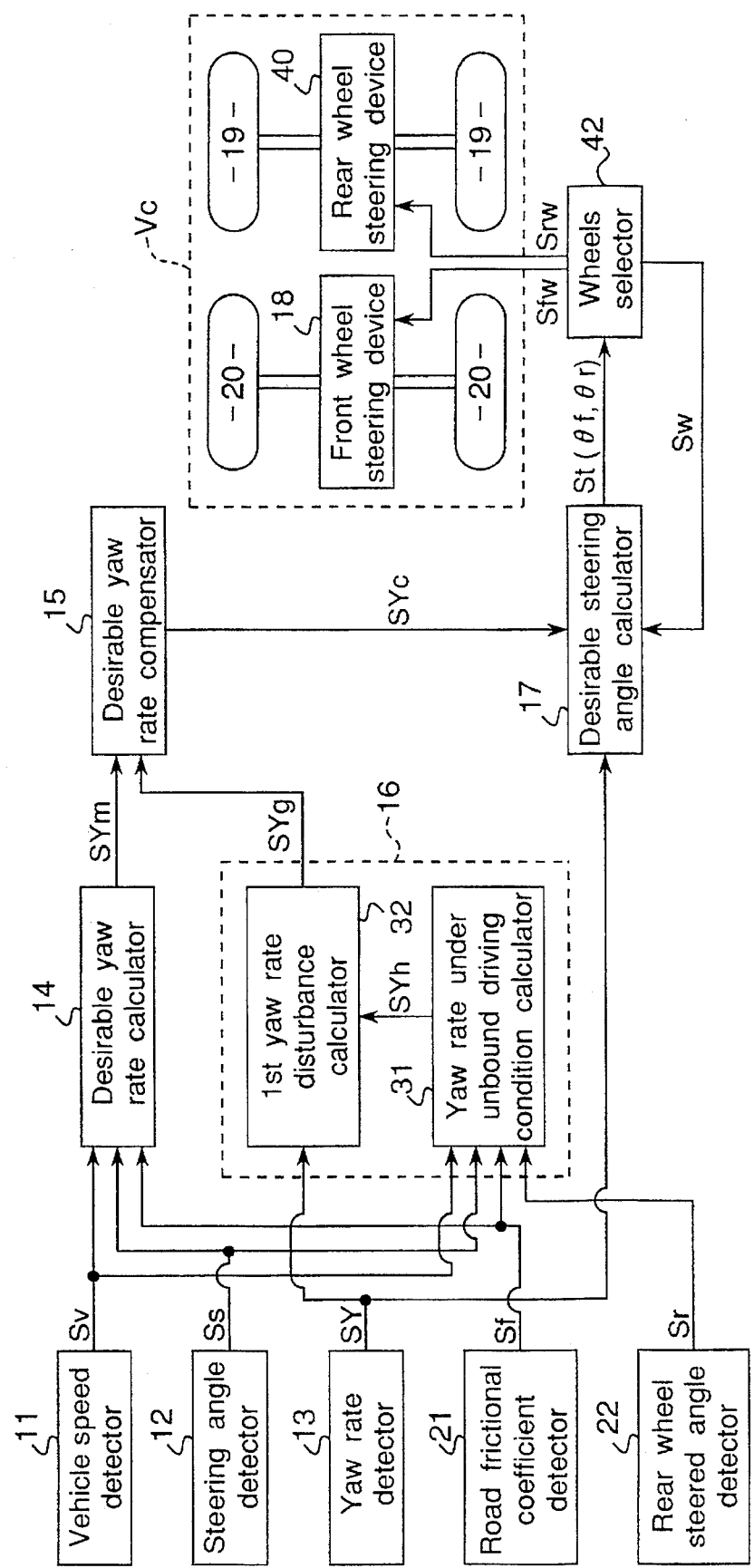
FIG. 1 is a block diagram showing a steering angle control apparatus according to a first embodiment of the present invention.

Referring to FIG. 1, a steering angle control apparatus according to a first embodiment of the present invention applied to a vehicle Vc having front wheels 20 and rear wheels 19 is shown. The steering angle control apparatus includes a vehicle speed detector 11, a steering angle detector 12, a yaw rate detector 13, a road frictional coefficient detector 21, a rear wheel steered angle detector 22, a desirable yaw rate calculator 14, a yaw rate under unbound driving condition calculator 31, a yaw rate disturbance calculator 32, a desirable yaw rate compensator 15, a desirable steering angle calculator 17, a wheels selector 42, a front wheel steering device 18, and a rear wheel steering device 40 which are connected to each other, as shown in FIG. 1.

At first, the driver can select either one pair or both pairs of front wheels 20 and rear wheels 19 to which the steering angle control is applied using the wheels selector 42. According to the driver's selection, the wheels selector 42 produces a wheel selection signal Sw and transfers to the desirable steering angle calculator 17.

The vehicle speed detector 11 detects the moving velocity of the vehicle Vc driving, and produces a speed signal Sv indicative of the detected vehicle speed. The steering angle detector 12 detects an angle at the steering wheel is turned, which contributes to an angle at the front wheels 20 are steered, and produces a steering angle signal Ss indicative of thus detected angle. The yaw rate detector 13 detects a yaw rate Y of the vehicle Vc which is yawing by the yaw force and produces a yaw rate signal SY indicative of the detected yaw rate Y. The road frictional coefficient detector 21 detects the coefficient of friction of the road surface, which is related to the magnitude of the yaw rate in the vehicle Vc, and produces a frictional coefficient signal Sf indicative of the detected frictional coefficient of road. The rear wheel steered angle detector 22 detects an angle at the rear wheels are steered and produces a rear wheel steered angle signal Sr indicative of thus detected steered angle of rear wheels 19.

Based on the speed signal Sv, steering angle signal Ss, and road frictional coefficient signal Sf, the desirable yaw rate calculator 14 calculates a desirable yaw rate Ym of the vehicle Vc and produces a desirable yaw rate signal Sym. The desirable yaw rate Ym is, more specifically, the target yaw rate when the wheels of vehicle Vc are suitable steered to drive stably.

Based on the speed signal Sv, steering angle signal Ss, road frictional coefficient signal St, and rear wheel steered angle signal Sr, the yaw rate under unbound driving condition calculator 31 calculates the reference yaw rate Yr when the vehicle travels under the unbound driving condition. Then, the calculator 31 produces a reference yaw rate signal SYh indicative of thus calculated reference yaw rate Yh. Hereinafter the yaw rate under unbound driving condition calculator 31 is referred to as "a reference yaw rate calculator" 31 for the sake of brevity.

Based on the yaw rate signal SY and the reference yaw rate signal Syh, the yaw rate disturbance calculator 32 calculates the values of the yaw rate Y which is influenced by a disturbance Yg from the reference yaw rate Yh. Then, the yaw rate disturbance calculator 32 produces a yaw rate disturbance signal SYg indicative of the detected disturbance Yg.

The reference yaw rate calculator 31 and the yaw rate disturbance calculator 32 constructs a yaw rate disturbance evaluator 16 which evaluates whether the current driving condition of the vehicle Vc is "bound" or "unbound". It is to be noted that the "bound" and "unbound" conditions mean a "disturbed state" in which external factors (disturbance) affect vehicle operation and a "not disturbed state" in which such disturbance is not applied, respectively. The disturbance evaluation means 16 outputs the evaluation result Sym to the desirable yaw rate compensator 15.

Based on the signal Sym indicative of the desirable yaw rate Ym and the signal SYg indicative of the evaluated yaw rate disturbance Yg, the desirable yaw rate compensator 15 compensates the target values of the desirable yaw rate Ym to obtain a compensated desirable yaw rate Yc having values appropriate to the current driving state of the vehicle Vc. Then, the desirable yaw rate compensator 15 produces a compensated yaw rate signal SYc.

Based on the yaw rate signal SY and compensated yaw rate signal Syc, the desirable steering angle calculator 17 selectively calculates a front wheel steering angle $\theta f$ and a rear wheel steering angle $\theta r$ according to the wheel selection signal Sw from the wheels selector 17. The front and rear wheel steering angles $\theta f$ and $\theta r$ are angles at which the front wheels 18 and the rear wheels 19 should be steered, respectively, to track the desirable yaw rate Ym calculated by the desirable yaw rate calculator 14. Then, the desirable steering angle calculator 17 produces a desirable steering angle signal St indicative of the selectively calculated front and rear wheel steering angles $\theta r$ or $\theta r$.

On receipt of steering angle signal St, the wheels selector 42 selectively produces a front wheel signal Sfw and a rear wheel signal Srw based on the front and rear wheel steering angles $\theta r$ and $\theta r$ contained in the angle signal St. Thus selected signal(s) Sfw or Srw is (are) transferred to the front wheel steering device 18 and the rear wheel steering device 40, respectively. For example, when the steering control of four-wheels is preferable, the driver simply selects both the front and rear wheels by the wheels selector 42 instead of selecting either one pair of wheels. It is to be noted that only the angle signal St and steering signal Sfw or Srw are calculated only for the wheels selected by the driver in this embodiment for the purpose of avoiding the unnecessary calculation to enhance the control response. However, it is needless to say that the desirable steering angle calculator 17 may calculates both the front and rear steering angles $\theta r$ and $\theta r$ and the selector 42 may selectively produce the steering signals Sfw and Srw according to the driver's selection.

Based on the steering signals Sfw and Srw which are produced according to the wheels selection made by the selector 42, the front and rear wheel steering devices 18 and 40 steer the front and rear wheels 20 and 19, respectively.

Note that, in a conventional target yaw rate tracking method in which the target value is determined from the vehicle speed, steering angle, and other factors, the optimum target value for the conditions is not obtained when there is steady disturbance, e.g., when travelling on a banked or canted surface subject to gravitational factors or when sensor drift occurs. As a result, the driver must steer to compensate, producing a sense of instability, and travel with a sideslip angle of zero is not obtained.

With the present invention, however, the driver does not need to compensate the steering on banked or canted roads, and the sense of instability is therefore reduced to a level at which in practice it can be ignored, because it is determined whether the vehicle is being operated under conditions influenced by steady disturbance, or the yaw rate generated by steady disturbance is estimated to update the target yaw rate.

In addition, misoperation of the rear wheels 19 due to sensor drift can be prevented without using high pass filters, and driving control achieving a zero sideslip angle for the vehicle is possible.

By means of this first embodiment of the invention, it is possible to determine without using incline detection sensors whether the vehicle is being operated on a canted or banked road surface, and the target yaw rate can be corrected to a yaw rate appropriate to the bank or cant. As a result, the driver does not need to compensate the steering on banked or canted roads, and the sense of instability is therefore reduced to a level at which in practice it can be ignored.

It is to be noted that a detailed description of the disturbance evaluation means 16 in the present embodiment is described below with reference to the plural embodiments in which it is applied.

Figure 2:
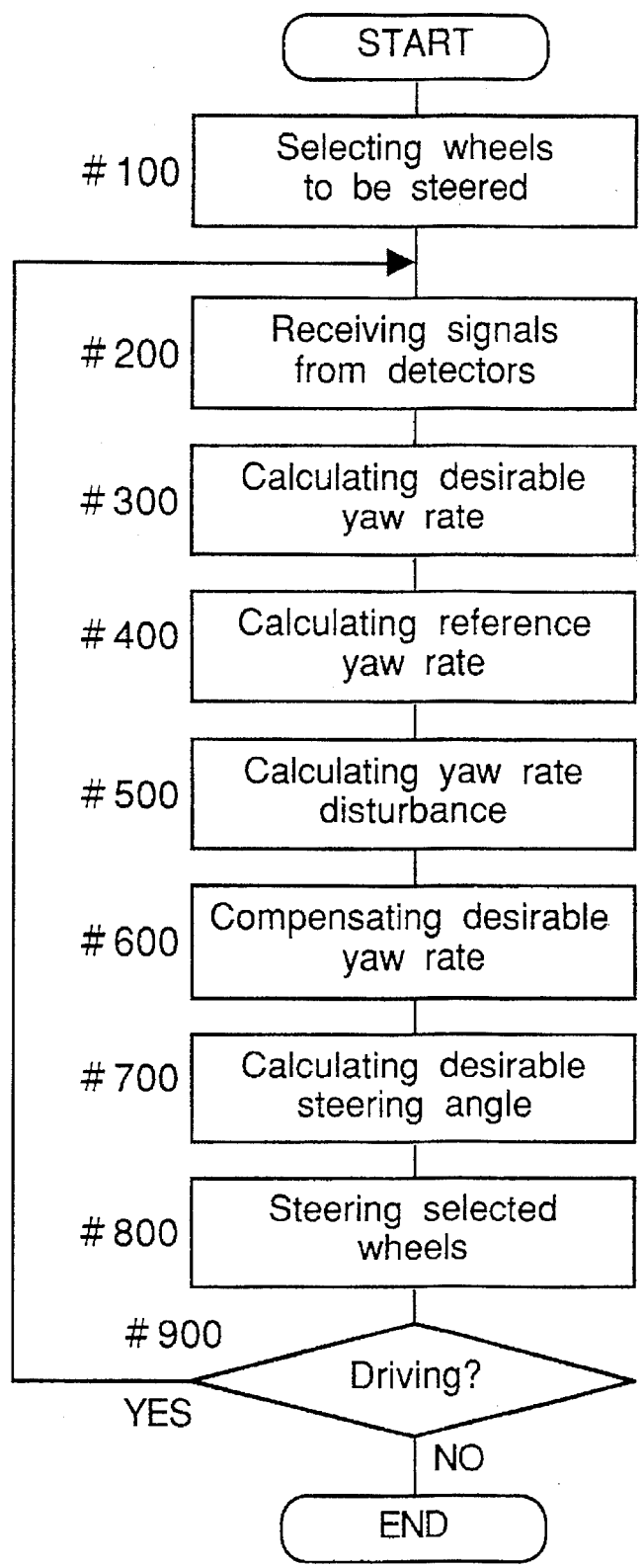
FIG. 2 is a flow chart showing an operation of the steering angle control apparatus of FIG. 1.

With referring to FIG. 2, the operation of the steering angle control apparatus of FIG. 1 is describe bellow.

At step #100, the driver selects the wheels to be applied with the steering control according to the present invention by the wheel steering selector 42.

At step #200, the detected signals Sv, Ss, SY, St, and Sr are read from the detectors 11, 12, 13, 21, and 22 in step 42, respectively.

At step #300, the respirable yaw rate Ym not reflecting a disturbed state is calculated by the desirable yaw rate calculator 14 based on the signals Sv, Ss, and St.

At step #400, the reference yaw rate Yh that should occur in the vehicle Vc during the unbound driving conditions is calculated by the desirable yaw rate calculator 14 based on the signals Sv, Ss, Sf, and St.

At step #500, the yaw rate disturbance Yg occurring when there is steady disturbance is calculated by the yaw rate disturbance calculator 32 based on the yaw rate Y detected by the detector 13 and the reference yaw rate Yh calculated by the calculator 31.

At step #600, the desirable yaw rate Ym not reflecting a disturbed state is compensated for the calculated yaw rate disturbance Yg. The resultant which is the compensated yaw rate Yc is obtained.

At step #700, the desirable steering angle θf or θr for either or both of front and rear wheels 20 and 19 is selectively calculated by the desirable steering angle calculator 17 according to the wheel selection signal Sw, so that the actually detected yaw rate Y becomes coincident with the compensated desirable yaw rate Yc.

At step #800, the wheels selector 20 selectively produces steering signals Sfw and Srw based on the desirable steering signal St (θf or θr), and transfers to the front and rear wheel steering devices 18 and 40, respectively. The wheels 20 and 19 are then operated according to the desirable steering angles θf and θr, respectively.

At step #900, it is judged whether the vehicle Vc is driving or not. Until when it is judged "NO", the procedure returns to step #200 so as to repeat one control cycle starting from step #200 to step 900 for the steering angle control of the vehicle Vc. When the vehicle is not driving, the procedure terminates.

Herebelow, the algorithm for determining the desirable yaw rate Ym executed in step #300 is described in detail. A vehicle model with two degrees of freedom is expressed by the following equation (1).

$$\begin{vmatrix} \dot{Y} \\ \dot{Z} \end{vmatrix} = \begin{vmatrix} -a11 & -a12 \\ -a21 & -a22 \end{vmatrix} \begin{vmatrix} Y \\ Z \end{vmatrix} + \begin{vmatrix} b1r \\ b2r \end{vmatrix} \theta r + \begin{vmatrix} b1f \\ b2f \end{vmatrix} \theta f \quad (1)$$

$a11 = 2(1f^2 kf + 1r^2 kr)/IV$
$a12 = 2(1fkf + 1rkr)/I$
$a21 = 1 + 2(1fkf - 1rkr)mV^2$
$a22 = 2(kf + kr)/mV$
$b1r = -21rkr/I$
$b2r = 2kr/mV$
$b1f = 21fkf/I$
$b2f = 2kf/mV$, where: Y is the yaw rate; Z, sideslip angle; θr, rear wheel steering angle; θf, front wheel steering angle; lr, distance between the vehicle's center of gravity and the rear axle; lf, distance between the vehicle's center of gravity and the front axle; kr, cornering force acting on the rear wheels; kf, cornering force acting on the front wheels; I, inertial moment of yawing; and m, inertial mass of vehicle; V, vehicle speed.

From equation (1) is derived equation (2):

$$Y(S) = Gr(S) \cdot \theta r(s) + Gf(S) \cdot \theta f(S) \quad (2)$$

where:

S, Laplacean;

$$Gr(s) = (b1rS + a22b1r - a12b2r)/$$
$$(S^2 + (a11a22)S + a11a22 - a12a21)$$
$$= (cS - d)/(S^2 + aS + b);$$

$$Gf(s) = (b1fS + a22b1f - a12b2f)/$$
$$(S^2 + (a11 + a22)S + a11a22 - a12a21)$$
$$= (eS + d)/(S^2 + aS + b);$$

$c = b1r$;
$e = b1f$;
$d = -a22b1r + a12b2r = a22b1f - a12b2f = 4kfkr(1f + 1r)/(1mV)$; and
$a = a11 + a22$; and $b = a11a22 - a12a21$.

Expanding equation (2) yields equation (3):

$$\dot{Y}(t)+a(V)Y(t)+b(V)Y(t)=c\theta r(t)-d(V)\theta r(t)+e\theta f(t)+d(V)\theta f(t) \quad (3),$$

where coefficients a, b, and d are functions of the vehicle speed V.

The normal model of the yaw rate is provided by the following equation.

$$\ddot{Y}m(t)+amYm(t)+bmYm(t)=Yobm\theta f(t) \quad (4),$$

where Yo is the steady yaw rate gain of the two wheel model when Z(S)/θf(S)=0 (where Z is the sideslip angle); Yo is obtained by equation (5).

$$Yo = (b1f - b2f \cdot b1r/b2r)/(-a11 + a21 \cdot b1r/b2r) \quad (5)$$
$$= 2kf(1f + 1r)V/(2kf1f(1f + 1r) + 1rmV^2).$$

As a result, the target or desirable yaw rate Ym when gravitational factors, sensor drift, and other disturbances are not present is provided by the following equation (6) based on equation (4).

$$Ym = \frac{bmYo}{S^2 + amS + bm} \theta f. \quad (6)$$

The above calculations are performed by the desirable yaw rate calculator 14. The desirable yaw rate signa SYm is also obtained by the following equation (6').

$$Ym = \frac{cS + d}{S^2 + aS + b} Ss, \quad (6')$$

where a, b, c, and d are characteristic properties of the vehicle Vc which can be determined based on the signals Sv and Sf.

Next, the algorithms for determining the reference yaw rate Yh, the yaw rate disturbance Yg, and the compensated yaw rate Yc executed in steps #400, #500, and #600, respectively, are described in detail.

The following relationship exists in the desirable yaw rate tracking control assuming that Yc is the desirable or target yaw rate changed or corrected by the desirable yaw rate compensator 15; Y is the yaw rate actually detected by the yaw rate detector 13; Yh is the reference yaw rate when driving with no disturbance factors and calculated by the calculator 31 based on the front and rear wheel steering angles, the vehicle speed, and the road frictional coefficients; and deviation e=YM−Y.

(In case that there is no disturbance)
When tracking: $Y = YM$, $e = 0$, and $Yh = Y (= YM)$.
When transient: $Y \rightarrow YM$, $e \rightarrow 0$, and
$Yh$ is nearly equal $Y (\neq YM)$.

(In case that there is disturbance)
When tracking: $Y = YM$, $e = 0$, and $Yh \neq Y$
When transient: $Y \rightarrow YM$, $e \rightarrow 0$, and $Yh \neq Y$ It is therefore known that when there is disturbance, $Y=Yh+Yg$ during both steady and transient period. Note that Yg here is the yaw rate resulting from gravitational factors and sensor drive.

The reference yaw rate Yh are calculated according to, for example, the following equation by the reference yaw rate calculator 31.

$$Yh = \frac{eS+d}{S^2+aS+b} \cdot \theta f(S) + \frac{cS-d}{S^2+aS+b} \cdot \theta r(S), \quad (7)$$

where $Yh=d/b$ $(\theta f - \theta r)$ in a steady state, and is defined by the following equation. The reference yaw rate signal Syh can obtained by the following equation (7').

$$SYh = \frac{ChsS+dhs}{S^2+AhsS+bhs} \cdot Ss + \frac{ChrS+dhr}{S^2+AhrS+bhr} \cdot Sr, \quad (7')$$

where Chs, dhs, Ahs, Chr, dhr, and bhr:

$$Yh = \frac{A \cdot V}{A \cdot V - B \cdot V^2} \cdot (\theta f - \theta r), \quad (8)$$

where $A=2 \cdot kf \cdot kr \cdot L$; $B=I \cdot m(lf \cdot kf - lr \cdot kr)$; and $L=If+Ir$.

The yaw rate disturbance Yg affected by steady disturbance and calculated by the yaw rate disturbance calculator 32 can be obtained by the following equation.

$$Yg = Y - Yh \quad (9).$$

The compensated yaw rate Yc to be tracked can thus be calculated by the desirable yaw rate compensator 33 using the yaw rates Yg and Ym as follows:

$$Yg = Y + Yh \quad (10).$$

By using thus obtained value as the compensated yaw rate Yc, it is possible to compensate for steady disturbance factors and gradually changing disturbance factors. More specifically, it is possible to remove the affects of gravitational factors, and drift in the yaw rate detector can be corrected.

Figure 19:
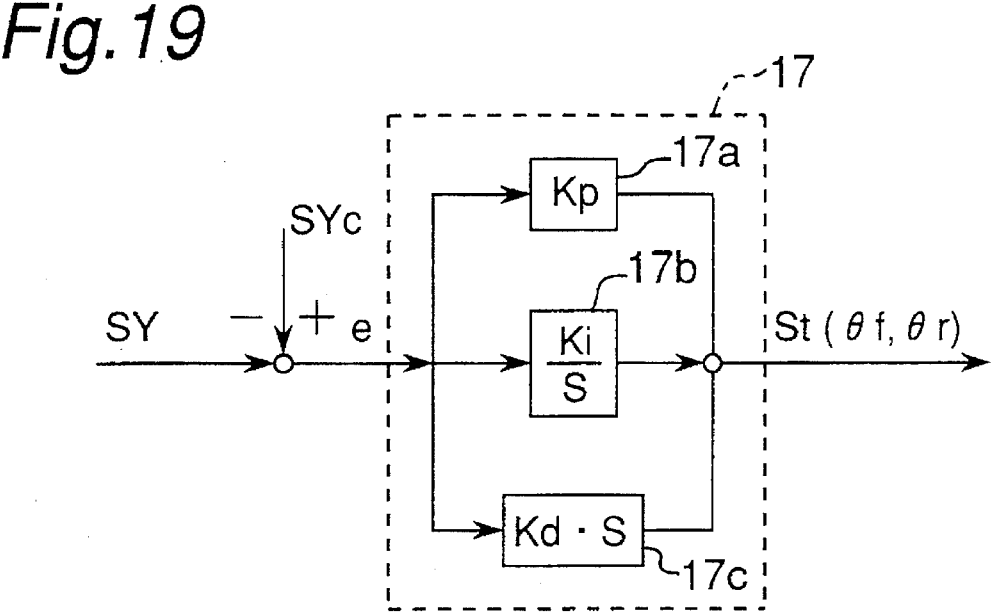
FIG. 19 is a block diagram showing the desirable steering angle calculator of FIGS. 1, 3, 5, 7, 9, 11, 13, and 15.

Next, the method for determining the desirable steering angle $\theta r$ and $\theta f$ based on the compensated reference yaw rate Yc and the detected yaw rate Y executed in step #700 by the desirable steering angle calculator 17 in detail with reference to FIG. 19. The desirable steering angle calculator 17 includes first, second, and third multipliers 17a, 17b, and 17c for multiply the input signal by a values of Kp, Ki/S, Kd·S, respectively. These values Kp, Ki/S, Kd·S are parameters in accordance with PID control method. The desirable steering angle signal St is obtained by equation (11) under PID control system.

$$\begin{aligned} St &= K1 \cdot e + k2 \cdot e + K3\Sigma e \\ &= Kp \cdot e + Kd \cdot S \cdot e + Ki \cdot e/S \quad (e = S \cdot e), \end{aligned} \quad (11)$$

where Kp, Kd, and Ki are constants having optional values.

Second embodiment

Figure 3:
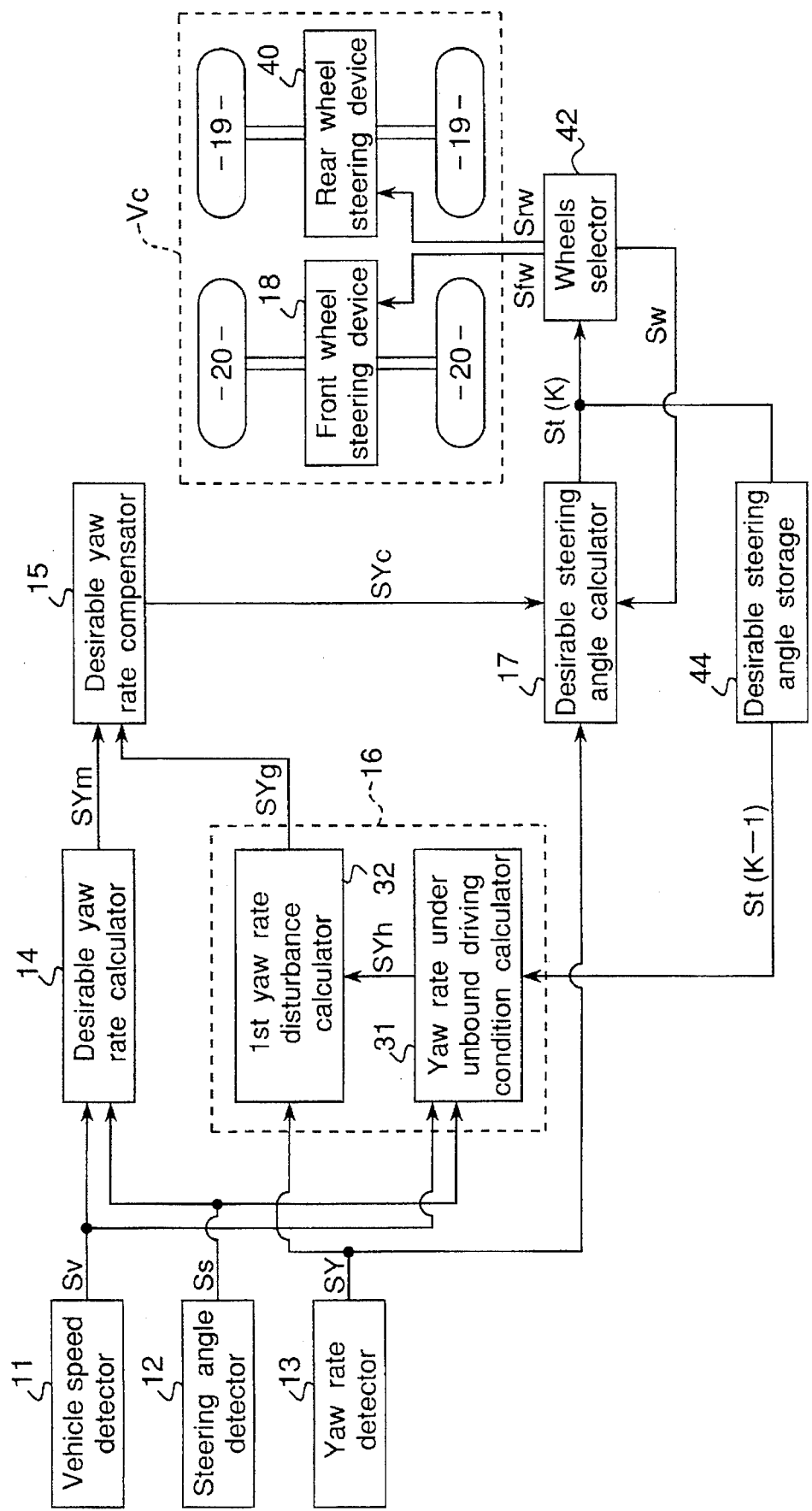
FIG. 3 is a block diagram showing a steering angle control apparatus according to a second embodiment of the present invention.

Referring to FIG. 3, an alternation of the steering angle control apparatus of FIG. 1 is shown. The road frictional coefficient detector 21 and rear wheel steered angle detector 22 in the apparatus shown FIG. 1 is removed in the apparatus shown in FIG. 3, but a desirable steering angle storage 44 is additionally provided thereto. The desirable steering angle storage 44 stores the desirable steering angle signal St(k−1) output from the desirable steering angle calculator 17, and transfers thus stored steering angle signal St to the reference yaw rate calculator 31 on receipt of the next signal St(k) from the calculator 17. "k" means an optional time of control cycle. Instead of the road frictional coefficient signal St and the rear wheel steered angle signal Sr, based on the desirable steering angle $\theta f$ and $\theta r$ obtained one control cycle before, the disturbance evaluation means 16 calculates the yaw rate disturbance signal SYg in the current control cycle (k).

Figure 4:
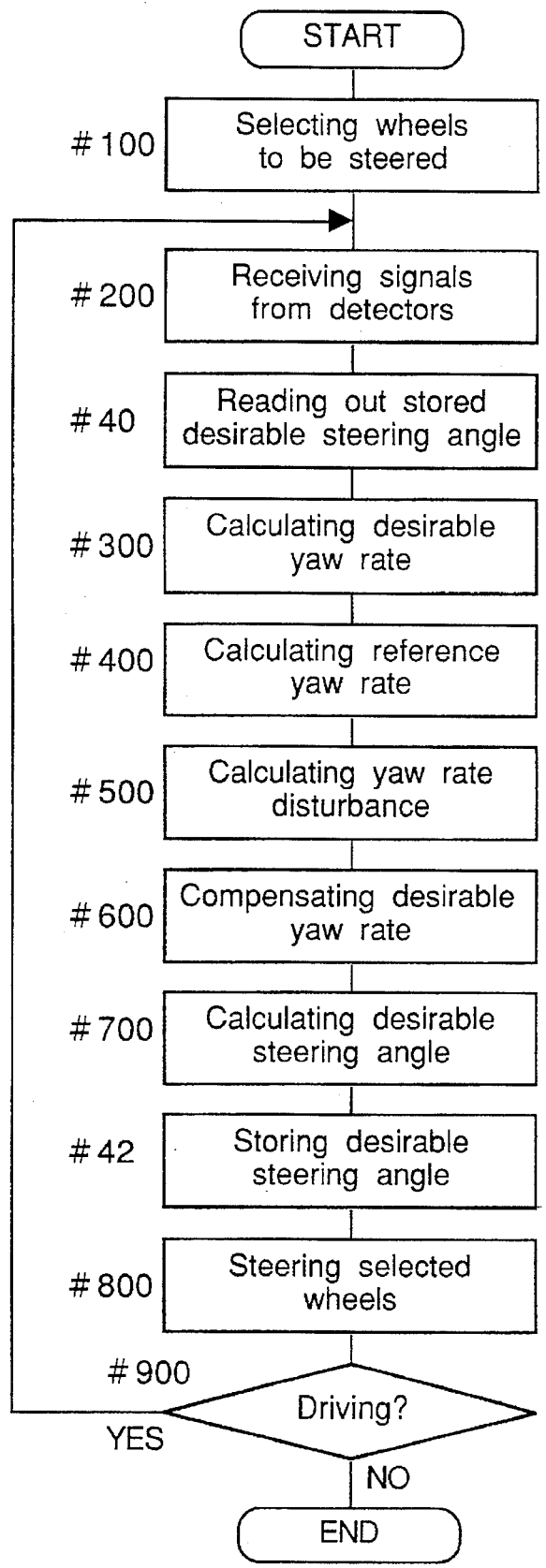
FIG. 4 is a flow chart showing an operation of the steering angle control apparatus of FIG. 3.

With referring to FIG. 4, the operation of steering angle control apparatus according to this embodiment is described below. Specifically, steps #40 and #42 are additionally inserted between the steps #200 and #300 and between steps #700 and #800, respectively.

At step #40, the desirable steering angle signal St(k−1) obtained by the desirable steering angle calculator 17 in the previous control cycle (k−1) is read out from the desirable steering angle storage 44, and is transferred to the reference yaw rate calculator 31 for the calculation of the yaw rate disturbance Yg(k) of the current control cycle (k). Then, the procedure advances to step #300.

At step #42, the desirable steering angle storage 44 stores the desirable steering angle signal St(k) of the current control cycle (k) which is obtained with respect to the desirable steering angle signal St(k−1). Then, the procedure advances to step #800.

According to this embodiment, the previous desirable steering angle signal St(k−1) calculated by the desirable steering angle calculator 17 (at step #700) and stored by the desirable steering angle storage 44 (at step #42) in the previous control cycle (k−1) one cycle before the current cycle (k) is transferred from the storage 44 to the yaw rate under unbound driving condition calculator 31 (at step #40) in the current control cycle (k). Thus, the yaw rate disturbance Yg can be calculated without the road frictional coefficient detector 21 and rear wheel steered angle detector 22.

Third embodiment

Figure 5:
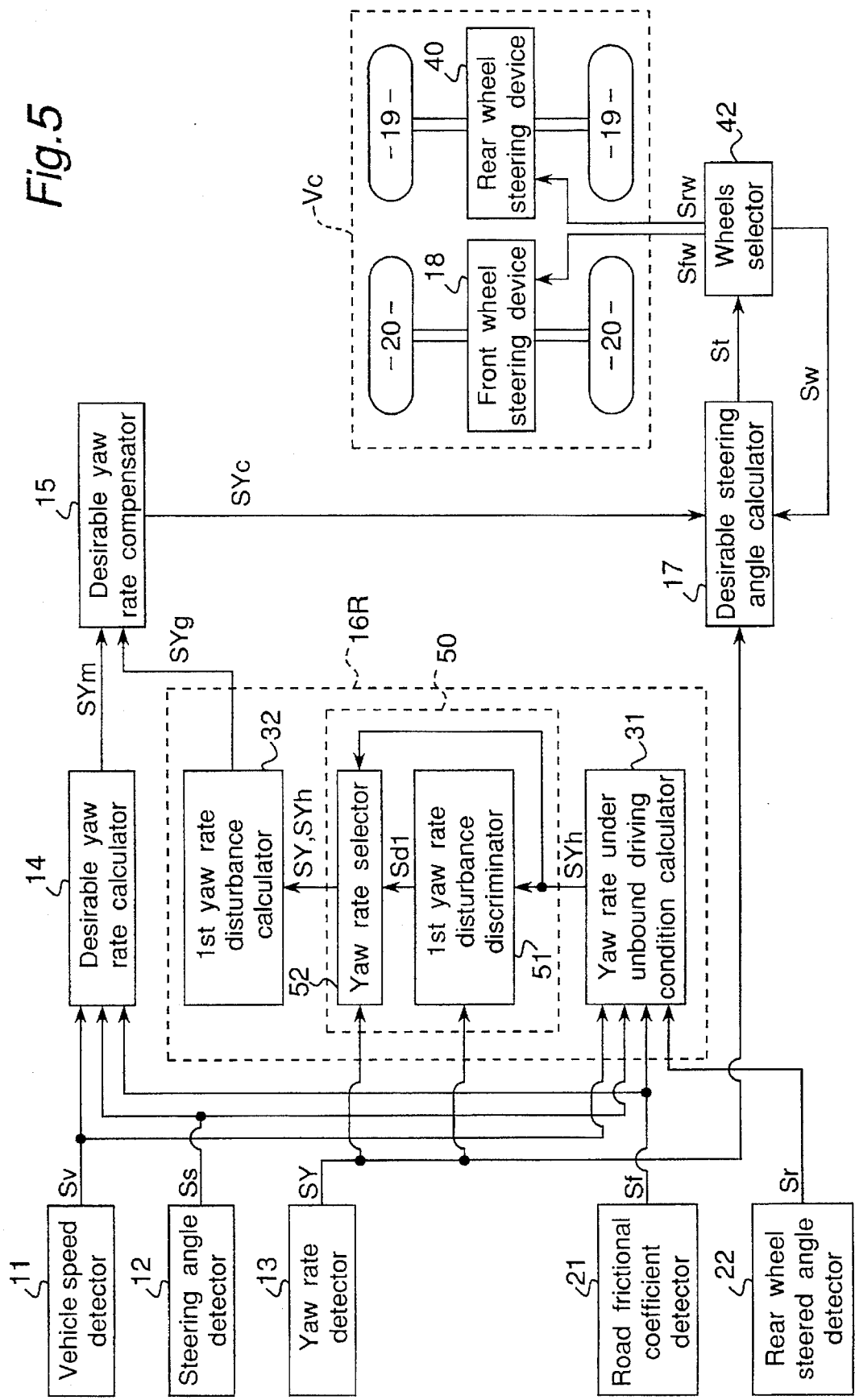
FIG. 5 is a block diagram showing a steering angle control apparatus according to a third embodiment of the present invention.

Referring to FIG. 5, other alternation of the steering angle control apparatus of FIG. 1 is shown. According to this embodiment, a first yaw rate disturbance discriminator 51 connected to the yaw rate detector 13 and the reference yaw rate calculator 31 for receiving the detected yaw rate signal SY and the calculated reference yaw rate signal SYh therefrom, respectively, are provided. Based on the signals SY and SYh, the discriminator 51 judges whether the yaw rate is disturbed by the steady disturbance factor the sudden or shaky disturbance factor. The discriminator 51 produces a discrimination signal Sd1 indicative of the judging result.

Furthermore, a yaw rate selector 52 connected to the detector 13, the calculator 31, and first yaw rate disturbance discriminator 51 is provided for selectively storing the signals SY and SYh based on the discrimination signal Sd1. When the discrimination signal Sd1 is indicative of the steady disturbance, the yaw rate selector 52 stores the yaw rate signals SY(k) and SYh(k) obtained in the current control cycle (k) as steady yaw rate signals SY(t) and SYh(t), and outputs thus stored steady signals SY(t) and SYh(t) as the yaw rate signals SY and SYh to the yaw rate disturbance calculator 32. These steady signals SY(t) and SYh(t) are renewed by the current signals SY(k) and SYh(k) every time when the discrimination signal Sd1 indicative of the steady disturbance factor.

However, when the signal Sd1 is indicative of the sudden or shaky disturbance, the selector 52 does not renew the steady yaw rate signals SY(t) and SYh(t) by the current signals SY(k) and SYh(k), and only outputs the latest steady signals SY(t) and SYh(t) which was renewed and stored in the last control cycle when the discrimination signal Sd1 indicative of the steady disturbance factor. The first yaw rate disturbance discriminator 51 and yaw rate selector 52 construct a first yaw rate disturbance "changer" 50 which controls the yaw rate disturbance calculator 32 to calculate the yaw rate disturbance Yg based on the current desirable yaw rate SYm(k) with respect to the latest steady yaw rate signals SY(t) and SYh(t). It is to be noted that the first yaw rate disturbance "changer" 50 is incorporated in the disturbance evaluation means 16 of FIG. 1 to construct a modified disturbance evaluation means 16R which controls the desirable yaw rate compensator 15 to compensate the desirable yaw rate SYm with respect to thus controlled yaw rate disturbance Yg.

Figure 6:
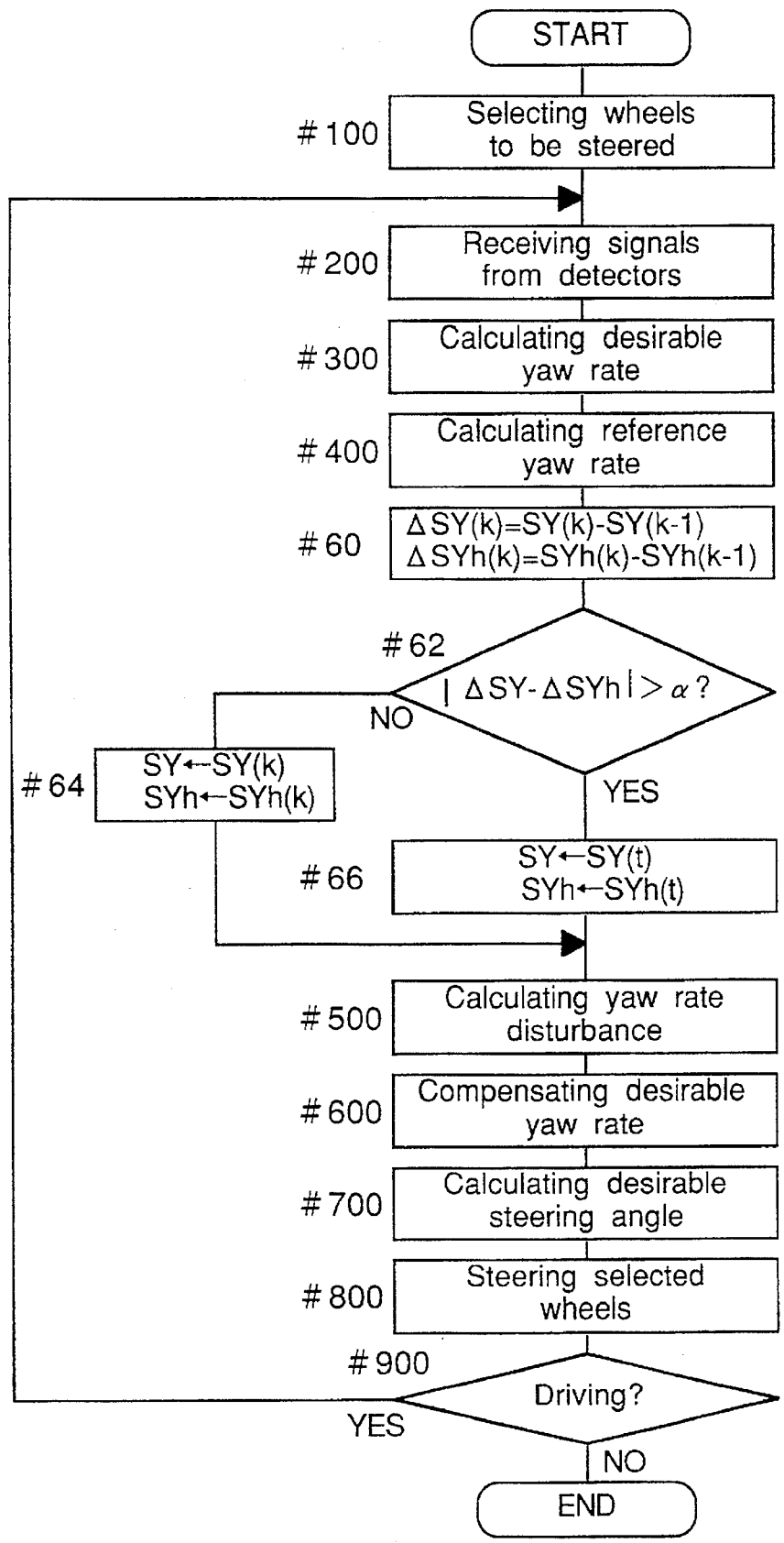
FIG. 6 is a flow chart showing an operation of the steering angle control apparatus of FIG. 5.

With reference to FIG. 6, the operation of the steering angle control apparatus according to this embodiment is described. Specifically, steps #60, "62, #64, and #66 are additionally inserted between the steps #400 and #500 of the flaw chart shown in FIG. 2.

At step #60, the changes of the detected yaw rate Y and reference yaw rate Yh are calculated based on the signals SY and SYh of the current (k) and previous (k−1) control cycle, as expressed by the following equations.

$$\Delta SY(k) = SY(k) - SY(k-1) \quad (12).$$

$$\Delta SYh(k) = SYh(k) - SYh(k-1) \quad (13).$$

At step #62, it is judged whether the difference of the changes of yaw rates Y and Yh obtained at step #60 is greater than a predetermined value $\alpha$ or not. The value $\alpha$ can be experimentally determined vale, and preferably is, for example, 0.5 deg/sec. in this embodiment.

When $|\Delta SY(k) - \Delta SY(k)| \leq \alpha$, it is judged "NO" meaning that the yaw rate Y is effected by the steady disturbance. The discrimination signal Sd1 indicative of the steady disturbance is produced and transferred from the discriminator 51 to the selector 52. Then, the procedure advances to the step #64.

At step #64, the values of yaw rates Y(k) and Yh(k) in the current control cycle (k) are adopted and stored as the steady yaw rate Y(t) and Yh(t), respectively, by the selector 52 on receipt of the signal Sd1. Thus stored steady yaw rate signals SY(t) and SYh(t) are employed as the signals SY and SYh, and are further transferred to the yaw rate disturbance calculator 32. Then the procedure advances to step #500.

However, when $|\Delta SY(k) - \Delta SY(k)| > \alpha$, it is judged "YES" meaning that the yaw rate Y is effected by the sudden or shaky disturbance. The discrimination signal Sd1 indicative of the sudden or shaky disturbance is produced and transferred from the discriminator 51 to the selector 52. Then, the procedure advances to the step #66.

At step #66, the values of steady yaw rates Y(t) and Yh(t) stored by the in the latest control chyle when it was judged as "steady disturbance" at step #62 are adopted as the yaw rate Y and Yh, respectively. Then the procedure advances to step #500.

According to this embodiment, when the sudden disturbance is detected, the disturbance yaw rate Yg (SYg) is calculated based on the detected yaw rate Y (SY) and the calculated reference yaw rate Yh (SYh) not in the current control cycle (k) but in the latest control cycle when it was judged that yaw rate was effected by the steady disturbance. Thus, the desirable yaw rate Ym can be compensated with respect to the yaw rates Y and Yh under the steady disturbance condition.

Fourth embodiment

Figure 7:
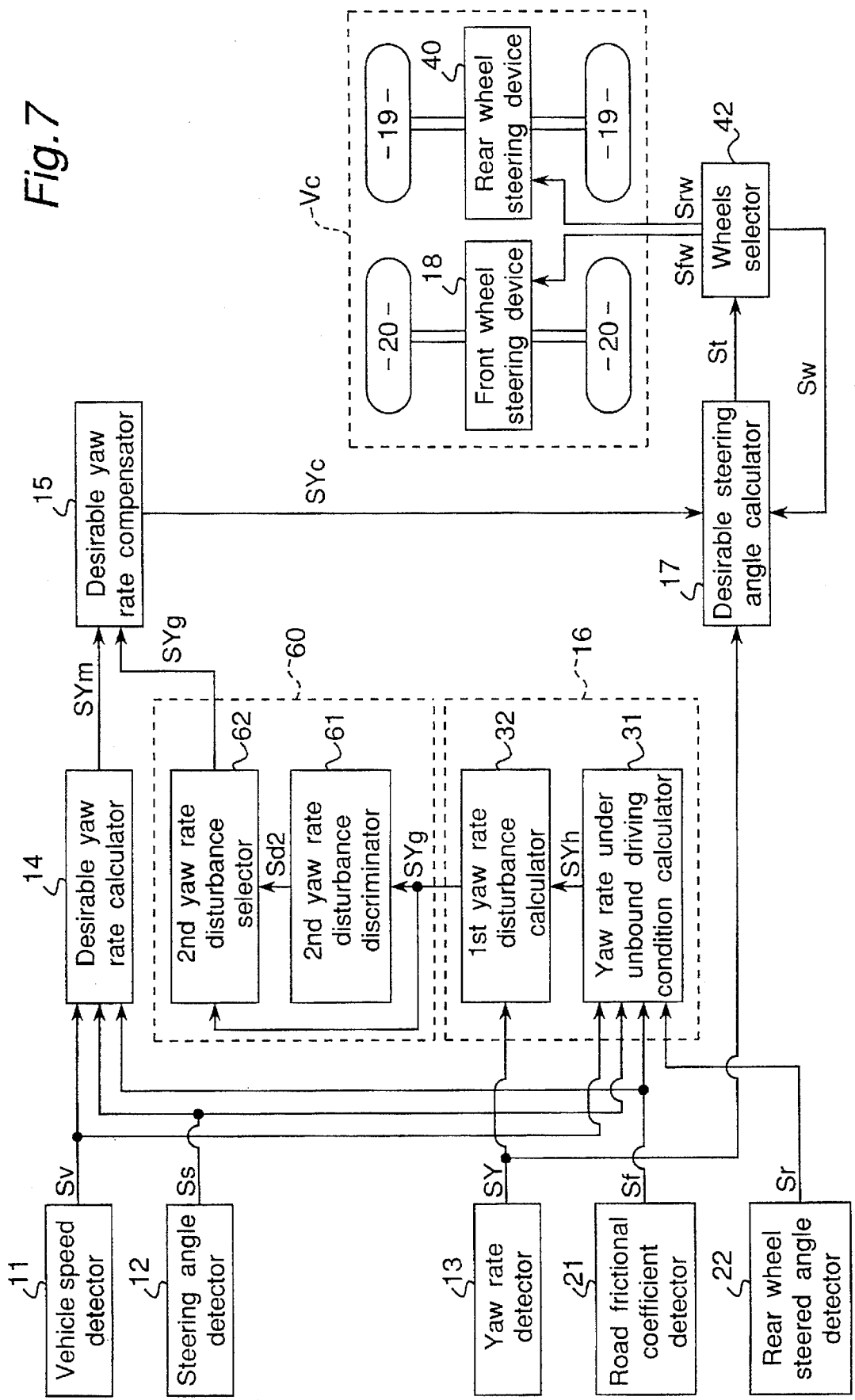
FIG. 7 is a block diagram showing a steering angle control apparatus according to a fourth embodiment of the present invention.

Referring to FIG. 7, other alternation of the steering angle control apparatus of FIG. 1 is shown. According to this embodiment, a second yaw rate disturbance discriminator 61 connected to the yaw rate disturbance calculator 32 is additionally provided for receiving the yaw rate disturbance signal SYg therefrom. Based on the yaw rate disturbance signal SYg, the second yaw rate disturbance discriminator 61 judges whether the yaw rate is disturbed by the steady disturbance factor or the sudden or shaky disturbance factor. The second discriminator 61 produces a second discrimination signal Sd2 indicative of the judging result thereby.

Furthermore, a yaw rate disturbance selector 62 connected to the yaw rate disturbance calculator 32 and the second yaw rate disturbance discriminator 61 for receiving the signals SYg and Sd2, respectively, therefrom are provided.

When the discrimination signal Sd2 is indicative of the steady disturbance, the yaw rate disturbance selector 62 stores the yaw rate disturbance signal SYg(k) obtained in the current control cycle (k) as steady yaw rate disturbance signal SYg(t), and outputs thus stored steady signal SYg(t) as the yaw rate disturbance signal SYg to the desirable yaw compensator 15. The steady yaw rate disturbance signal SYg(t) is renewed by the current signal SYg(k) every time when the discrimination signal Sd2 indicative of the steady disturbance factor.

However, when the signal Sd2 is indicative of the sudden or shaky disturbance, the selector 62 does not renew the steady yaw rate disturbance signal SYg(t) by the current signal SYg(k), and only outputs the latest steady signal SYg(t) which was renewed and stored in the last control cycle when the discrimination signal Sd2 indicative of the steady disturbance factor. The second yaw rate disturbance discriminator 61 and yaw rate disturbance selector 62 construct a second yaw rate disturbance "changer" 60 which controls the desirable yaw rate compensator 15 to compensate the desirable yaw rate SYm with respect to thus controlled yaw rate disturbance Yg.

Figure 8:
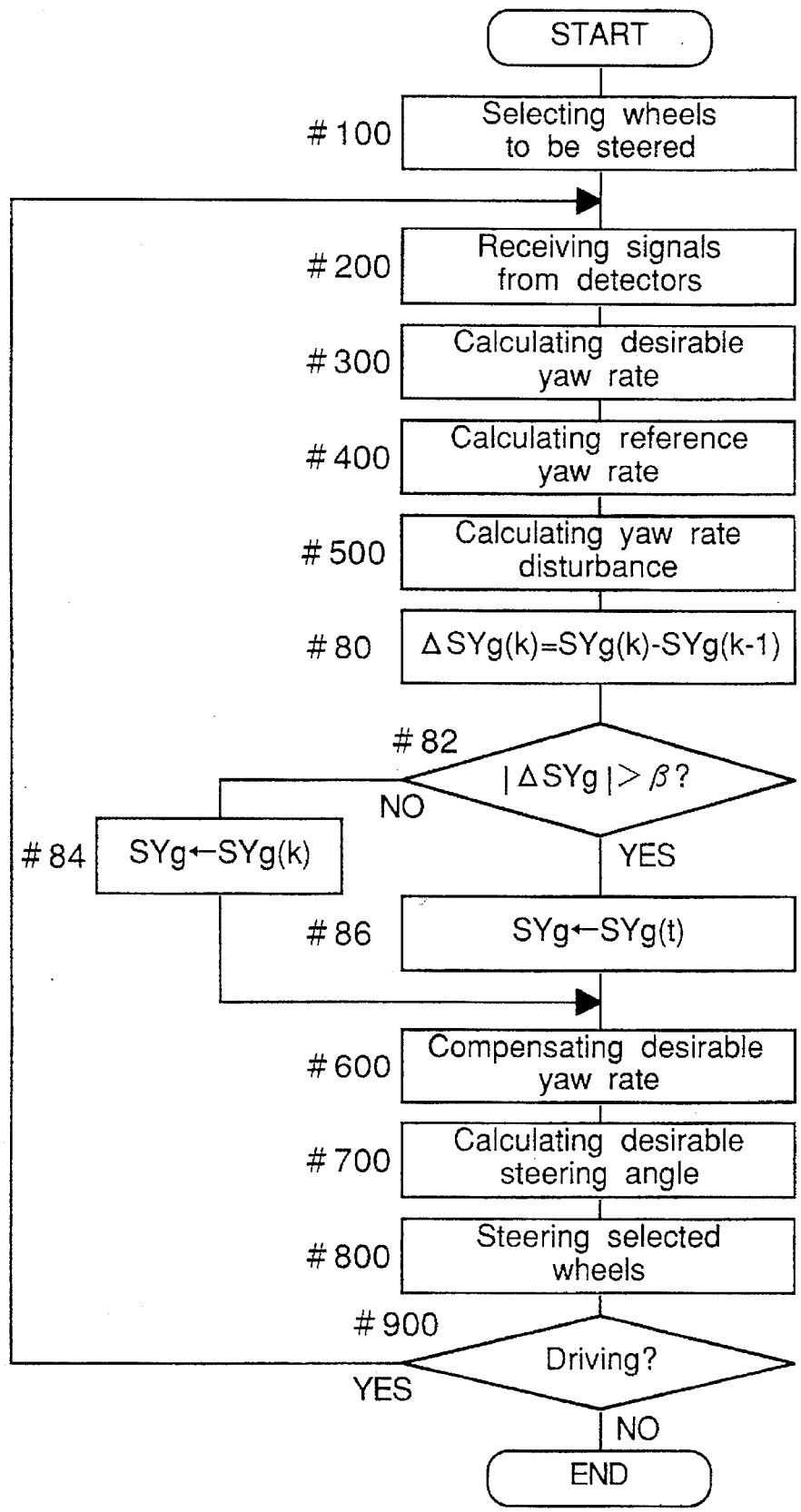
FIG. 8 is a flow chart showing an operation of the steering angle control apparatus of FIG. 7.

With reference to FIG. 8, the operation of the steering angle control apparatus according to this embodiment is described. Specifically, steps #80, #82, #84, and #86 are additionally inserted between the steps #500 and #600 of the flaw chart shown in FIG. 2.

At step #80, the changing rate of the yaw rate disturbance Yg is calculated based on the yaw rate disturbance signals SYg(k) obtained at step #500 in the current control cycle (k) and the signal SYg(k−1) obtained at step #500 in the previous (k−1) control cycle, as expressed by the following equations.

$$\Delta SYg = SYg(k) - SYg(k-1) \quad (14).$$

At step #82, it is judged whether the changing rate of yaw rate disturbance Yg obtained at step #80 is greater than a predetermined value $\beta$, for example 5 deg/sec² or not.

When $|\Delta SYg| \leq \beta$, it is judged "NO" meaning that the yaw rate Y is effected by the steady disturbance. The second discrimination signal Sd2 indicative of the steady disturbance is produced and transferred from the discriminator 61 to the selector 62. Then, the procedure advances to the step #84.

At step #84, the values of yaw rate disturbance Yg(k) in the current control cycle (k) is adopted and stored as the steady yaw rate disturbance Yg(t) by the selector 62 on receipt of the signal Sd2. Thus stored steady yaw rate disturbance signal SYg(t) is employed as the yaw rate disturbance signal SY, and is further transferred to the desirable yaw rate compensator 15. Then the procedure advances to step #600.

However, when $|\Delta SYg|>\beta$, it is judged "YES" meaning that the yaw rate Y is effected by the sudden or shaky disturbance. The discrimination signal Sd2 indicative of the sudden or shaky disturbance is produced and transferred from the discriminator 61 to the selector 62. Then, the procedure advances to the step #86.

At step #86, the values of steady yaw rates disturbance Yg(t) stored in the latest control chyle when it was judged as "steady disturbance" at step #82 is adopted as the yaw rate disturbance Yg. Then the procedure advances to step #600.

According to this embodiment, when the sudden or shaky disturbance which may be caused by fault of sensors used in the vehicle speed detector 11, steering angle detector 12, yaw rate detector 13, road frictional detector 21, and rear wheel steered angle detector 22 is detected, the steady disturbance yaw rate Yg (SYg) obtained in the latest control cycle under the steady disturbance condition is used for the compensation of the desirable yaw rate Ym.

Fifth embodiment

Figure 9:
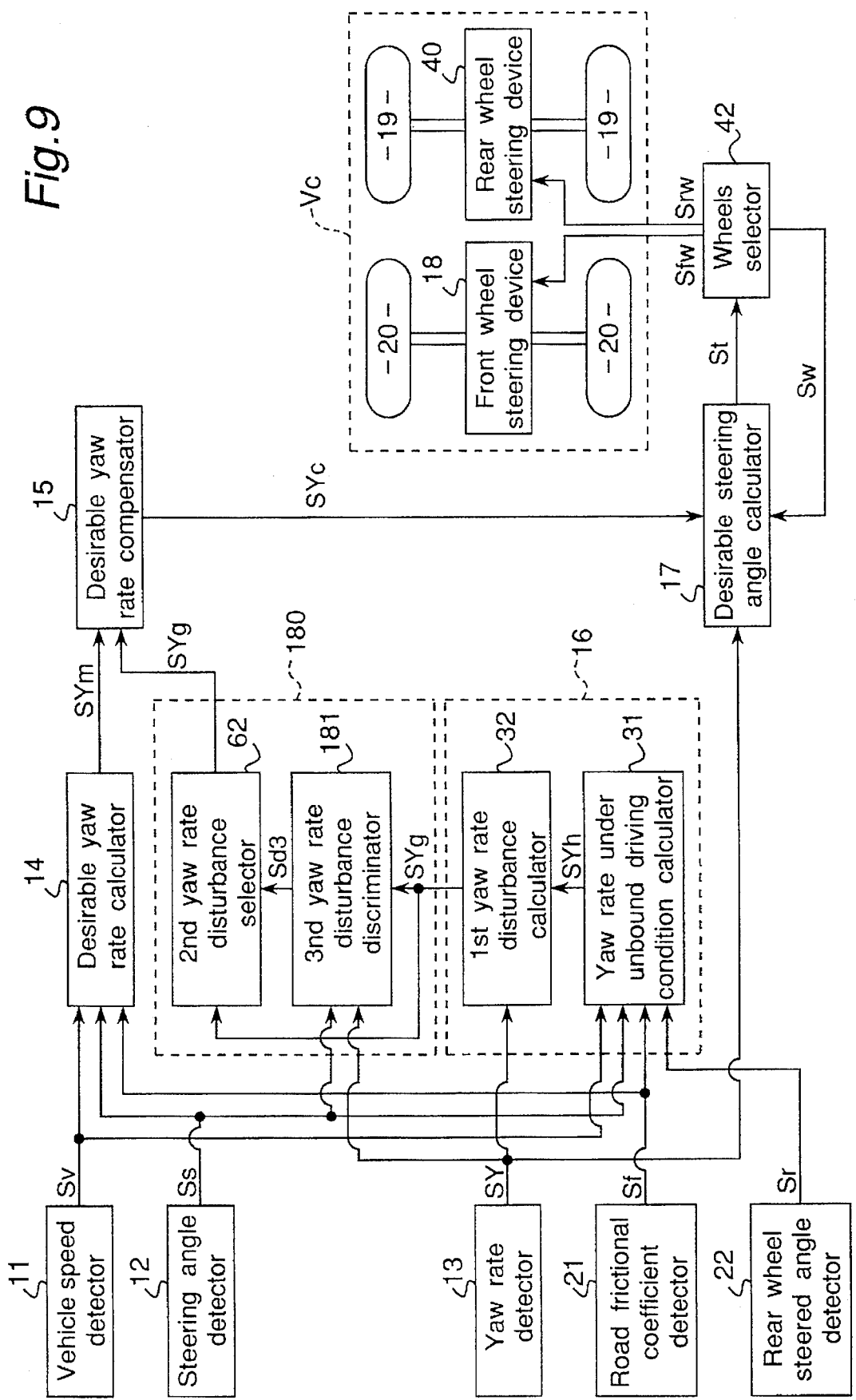
FIG. 9 is a block diagram showing a steering angle control apparatus according to a fifth embodiment of the present invention.

Referring to FIG. 9, an alternation of the steering angle control apparatus of FIG. 7 is shown. According to this embodiment, the second yaw rate disturbance discriminator 61 in FIG. 7 is replaced by a third yaw rate disturbance discriminator 181 connected to the steering angle detector 12, the yaw rate detector 13, and the yaw rate disturbance calculator 32 for receiving the steering angle signal Ss, the detected yaw rate signal SY, and the yaw rate disturbance signal SY therefrom, respectively.

Based on each of signals Ss, SY, and SYg, the third yaw rate disturbance discriminator 181 judges whether the yaw rate is disturbed by the steady disturbance factor or the sudden or shaky disturbance factor, and produces a third discrimination signal Sd3 indicative of the judging result thereby.

When the discrimination signal Sd3 is indicative of the steady disturbance, the yaw rate disturbance selector 62 renews the steady yaw rate disturbance signal SYg(t) by the current value, and outputs thus renewed steady signal SYg(t) to the desirable yaw compensator 15.

However, when the signal Sd3 is indicative of the sudden or shaky disturbance, the selector 62 only outputs the latest steady signal SYg(t) to the compensator 15. The second yaw rate disturbance discriminator 181 and yaw rate disturbance selector 62 construct a third yaw rate disturbance "changer" 180 which controls the desirable yaw rate compensator 15 to compensate the desirable yaw rate Sym with respect to thus controlled yaw rate disturbance Yg.

Figure 10:
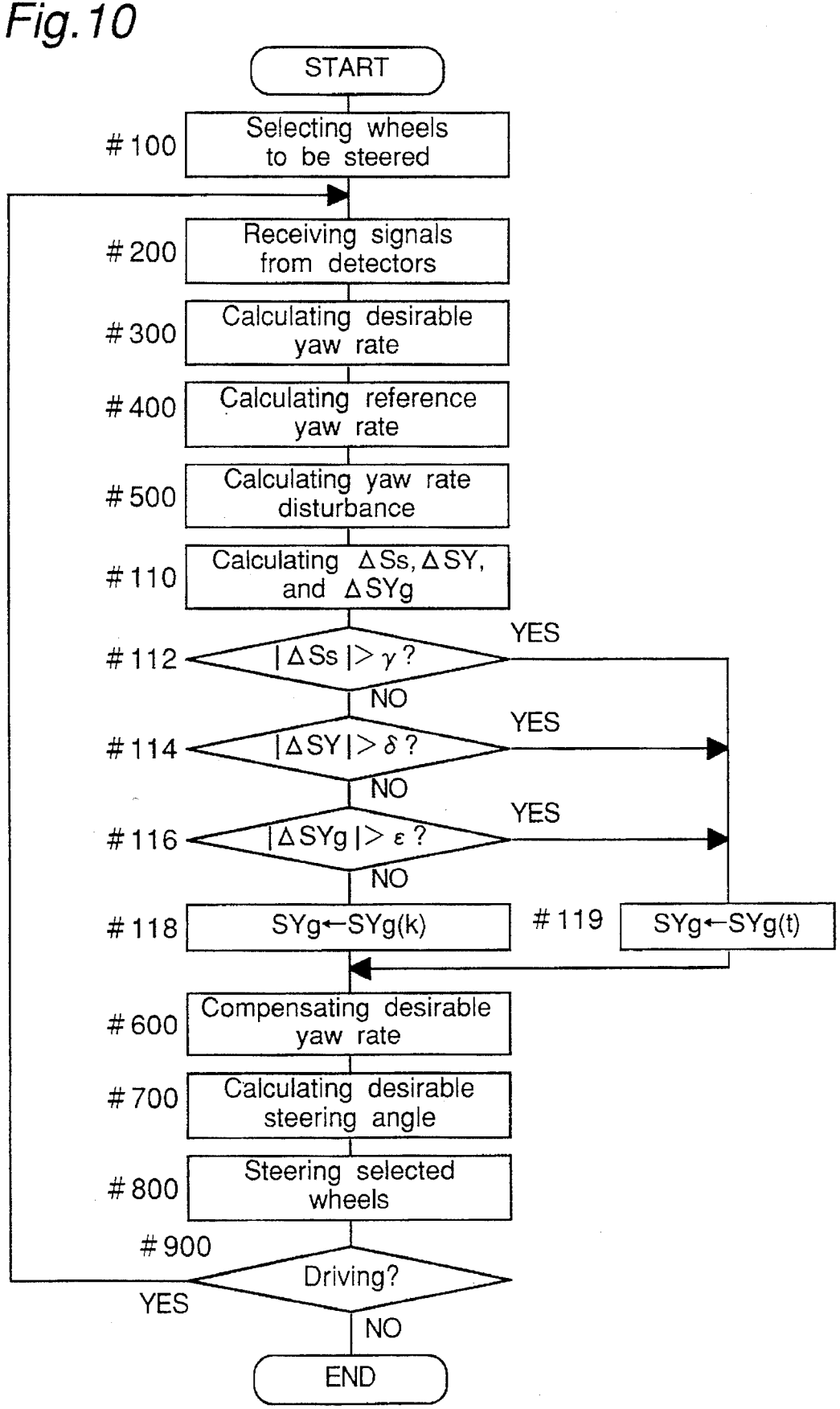
FIG. 10 is a flow chart showing an operation of the steering angle control apparatus of FIG. 9.

With reference to FIG. 10, the operation of the steering angle control apparatus according to this embodiment is described. Specifically, steps #110, #112, #114, #116, #118, and #119 are additionally inserted between the steps #500 and #600 of the flaw chart shown in FIG. 2.

At step #110, the changing rate of the steering angle, the yaw rate Y, and the yaw rate disturbance Yg are calculated based on the signals obtained at step #200 in the current control cycle (k) and in the previous (k−1) control cycle, as expressed by the above described equation (14) and following equations.

$$\Delta Ss = Ss(k) - Ss(k-1) \quad (15).$$

$$\Delta SY = SY(k) - SY(k-1) \quad (16).$$

At step #112, it is judged whether the changing rate of steering angle signal Ss obtained at step #110 is greater than a predetermined value $\gamma$, for example 360 deg/sec. or not.

When $|\Delta Ss| \leq \gamma$, it is judged "NO" meaning that the yaw rate Y is effected by the steady disturbance. Then, the procedure advances to the step #116.

At step #114, it is judged whether the changing rate of detected yaw rate signal SY obtained at step #110 is greater than a predetermined value $\delta$, for example 19 deg/sec$^2$, or not. When $|\Delta SY| \leq \delta$, it is judged "NO" meaning that the yaw rate Y is effected by the steady disturbance. Then, the procedure advances to the step #116.

At step #116, it is judged whether the changing rate of yaw rate disturbance Yg obtained at step #110 is greater than a predetermined value $\epsilon$, for example 5 deg/sec$^2$, or not. When $|\Delta Syg| \leq \epsilon$, it is judged "NO" meaning that the yaw rate Y is effected by the steady disturbance. The third discrimination signal Sd3 indicative of the steady disturbance is produced and transferred from the discriminator 181 to the selector 62. Then, the procedure advances to the step #118.

At step #118, the steady yaw rate disturbance signal Syg(t) is renewed by the value of yaw rate disturbance Syg(k) obtained at step #500 in the current control cycle (k), and is transferred from the selector 62 to the desirable yaw rate compensator 15.

However, even when it is judged "YES" at any one of steps #112, #114, and #116 meaning that the yaw rate Y is effected by the sudden or shaky disturbance, the third discrimination signal Sd3 indicative of the sudden or shaky disturbance is produced and transferred from the discriminator 181 to the selector 62. Then, the procedure advances to the step #119.

At step #119, the values of latest steady yaw rate disturbance Yg(k) is only transferred from the selector 62 to the compensator 15. It is to be noted that the operations at steps #110, #112, #114, and #116 are performed by the third yaw rate disturbance discriminator 181, and the operations at steps #118 and #119 are performed by the yaw rate disturbance selector 62.

According to this embodiment, when any of sensors used in the detectors 11, 12, 13, 21, and 22 a fault therein, the desirable yaw rate Ym is compensated with respect to the latest steady disturbance yaw rate Yg (Syg) in a manner similar to that in the fifth embodiment.

Sixth embodiment

Figure 11:
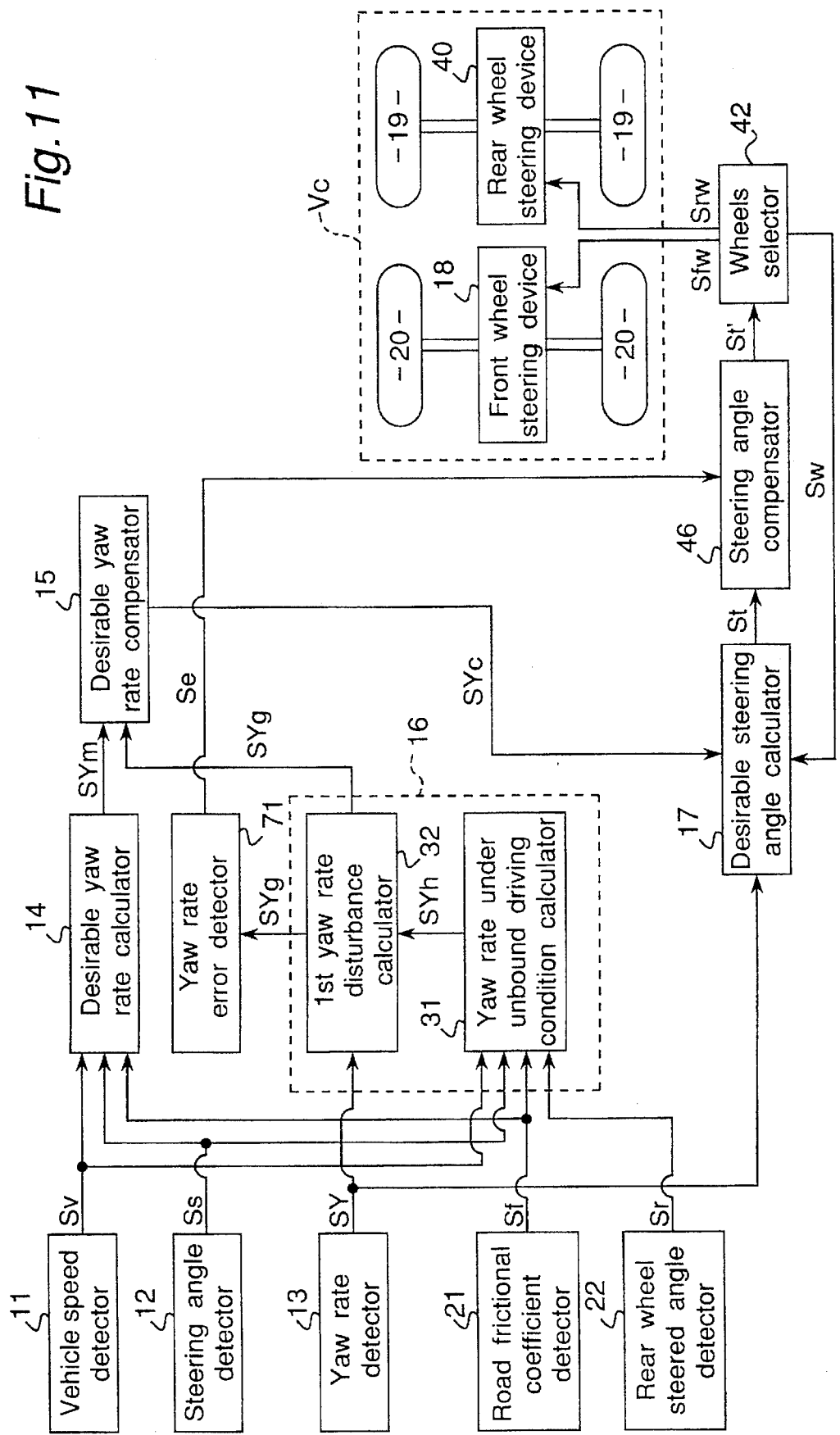
FIG. 11 is a block diagram showing a steering angle control apparatus according to a sixth embodiment of the present invention.

Referring to FIG. 11, other alternation of the steering angle control apparatus of FIG. 1 is shown. According to this embodiment, a steering angle compensator 46 and a yaw rate error detector 71 are additionally provided. The yaw rate error detector 71 is connected to the yaw rate disturbance calculator 32 for receiving the yaw rated disturbance signal Syg therefrom to detects a yaw error. On detection of the yaw error, the yaw rate error detector produces a yaw rate error signal Se. The steering angle compensator 46 is placed between the desirable steering angle calculator 17 and the wheels selector 42, and is connected to the yaw rate error detector 71. The steering angle compensator 46 compensates the desirable steering angle signal St with respect to the yaw rate error signal Se to produce a compensated steering angle signal St' so that the wheels selector produces the steering signals Sfw and Srw.

Figure 12:
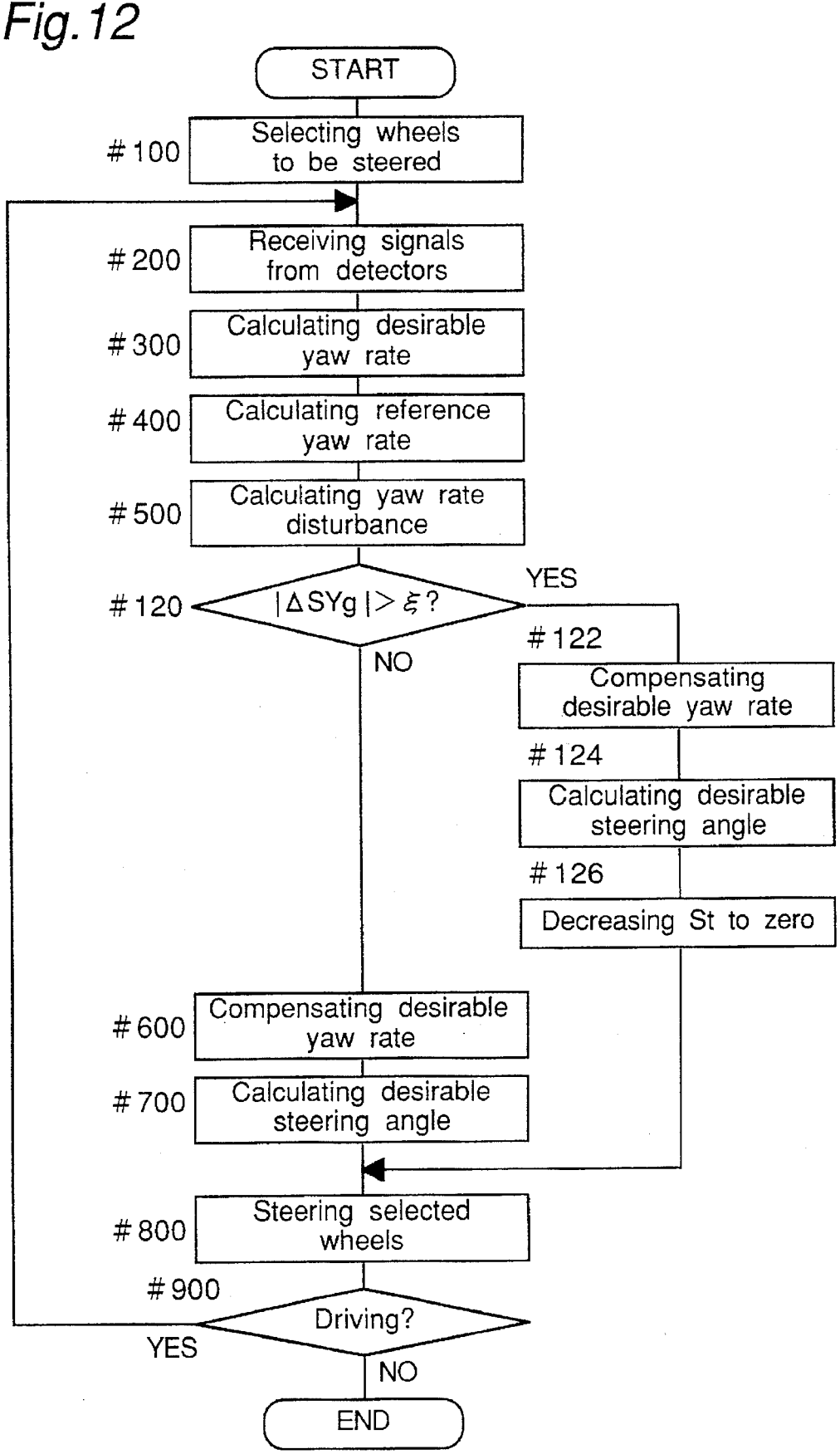
FIG. 12 is a flow chart showing an operation of the steering angle control apparatus of FIG. 11.

With reference to FIG. 12, the operation of the steering angle control apparatus according to this embodiment is described. Specifically, a step #120 is additionally inserted between the steps #500 and #600 of the flaw chart shown in FIG. 2. Furthermore, steps #122, #124, and #126 branched from the added step #120 and converging to the step #800 are provided.

At step #120, it is judged whether the changing rate of the yaw rate disturbance Yg calculated by the equation (14) is greater than a predetermined value $\xi$, for example 10 deg/sec or not. When $|\Delta Syg| \leq \xi$, it is judged "NO" meaning that the yaw rate Y is effected by the steady disturbance. Then, the procedure advances to the step #600.

However, when it is judged "YES" at step #120 meaning that the yaw rate Y is effected by the sudden or shaky disturbance, the yaw rate error signal Se indicative of the sudden or shaky disturbance is produced and transferred from the error detector 171 to the steering angle compensator 46. Then, the procedure advances to the step #122.

At step #122, the desirable yaw rate Ym not reflecting a disturbed state is compensated for the calculated yaw rate disturbance Yg. The resultant which is the compensated yaw rate Yc is obtained.

At step #124, the desirable steering angle $\theta f$ or $\theta r$ for either or both of front and rear wheels 20 and 19 is selectively calculated by the desirable steering angle calculator 17 according to the wheel selection signal Sw, so that the actually detected yaw rate Y becomes coincident with the compensated desirable yaw rate Yc.

At step #126, the desirable steering angle signal St representing front wheel steering angle $\theta f$ or rear wheel steering angle $\theta r$ which the driver selected is decreased to zero at a predetermined rate, so that the steered selected wheels 20 or 19 are returned to the non-steered state by a predetermined period. Then, the procedure advances to step #800.

According to this embodiment, when the sudden or shaky disturbance which may be caused by fault of sensors used in the vehicle speed detector 11, steering angle detector 12, yaw rate detector 13, road frictional detector 21, and rear wheel steered angle detector 22 is detected, the steady disturbance yaw rate Yg (Syg) obtained in the latest control cycle under the steady disturbance condition is used for the compensation of the desirable yaw rate Ym.

Seventh embodiment

Figure 13:
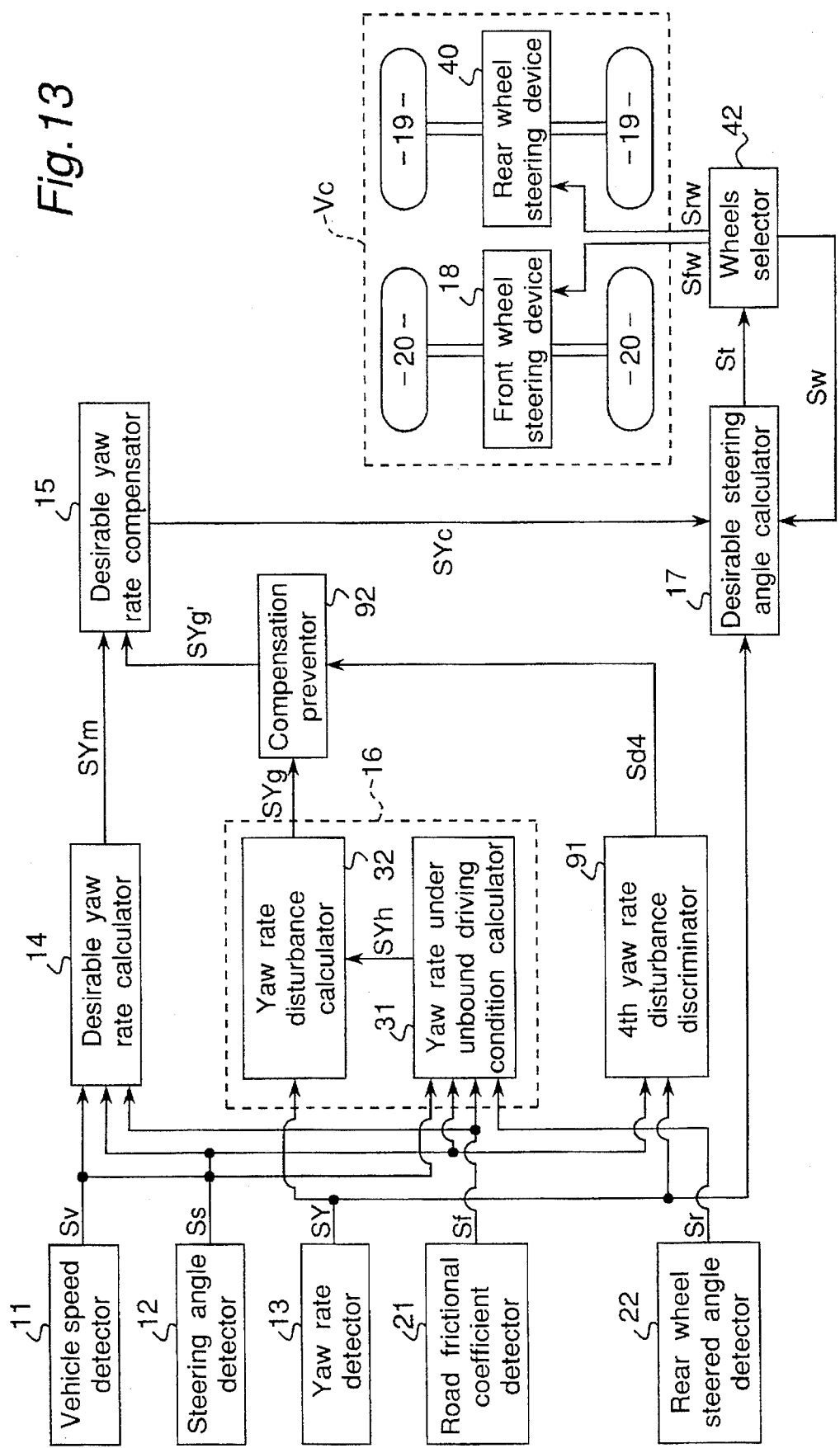
FIG. 13 is a block diagram showing a steering angle control apparatus according to a seventh embodiment of the present invention.

Referring to FIG. 13, other alternation of the steering angle control apparatus of FIG. 1 is shown. According to this embodiment, a fourth yaw rate disturbance discriminator 91 and a compensation precentor 92 are additionally provided. The fourth yaw rate disturbance discriminator 91 is connected to the steering angle detector 12 and the yaw rate detector 13 for receiving the signals Ss and SY to detect a yaw rate error and produce a steady yaw rate disturbance detection signal.

The compensation precentor 92 is connected to the yaw rate disturbance calculator 32 and the discriminator detector 91 for receiving the signals Syg and Sc therefrom, respectively. When the discrimination signal Sd4 is indicative of the sudden or shaky disturbance, the compensation precentor 92 produces a second yaw rate disturbance signal Syg' whose value is zero and transfers this second yaw rate disturbance signal Syg' instead of the yaw rate disturbance signal Syg to the desirable yaw rate compensator 15.

Figure 14:
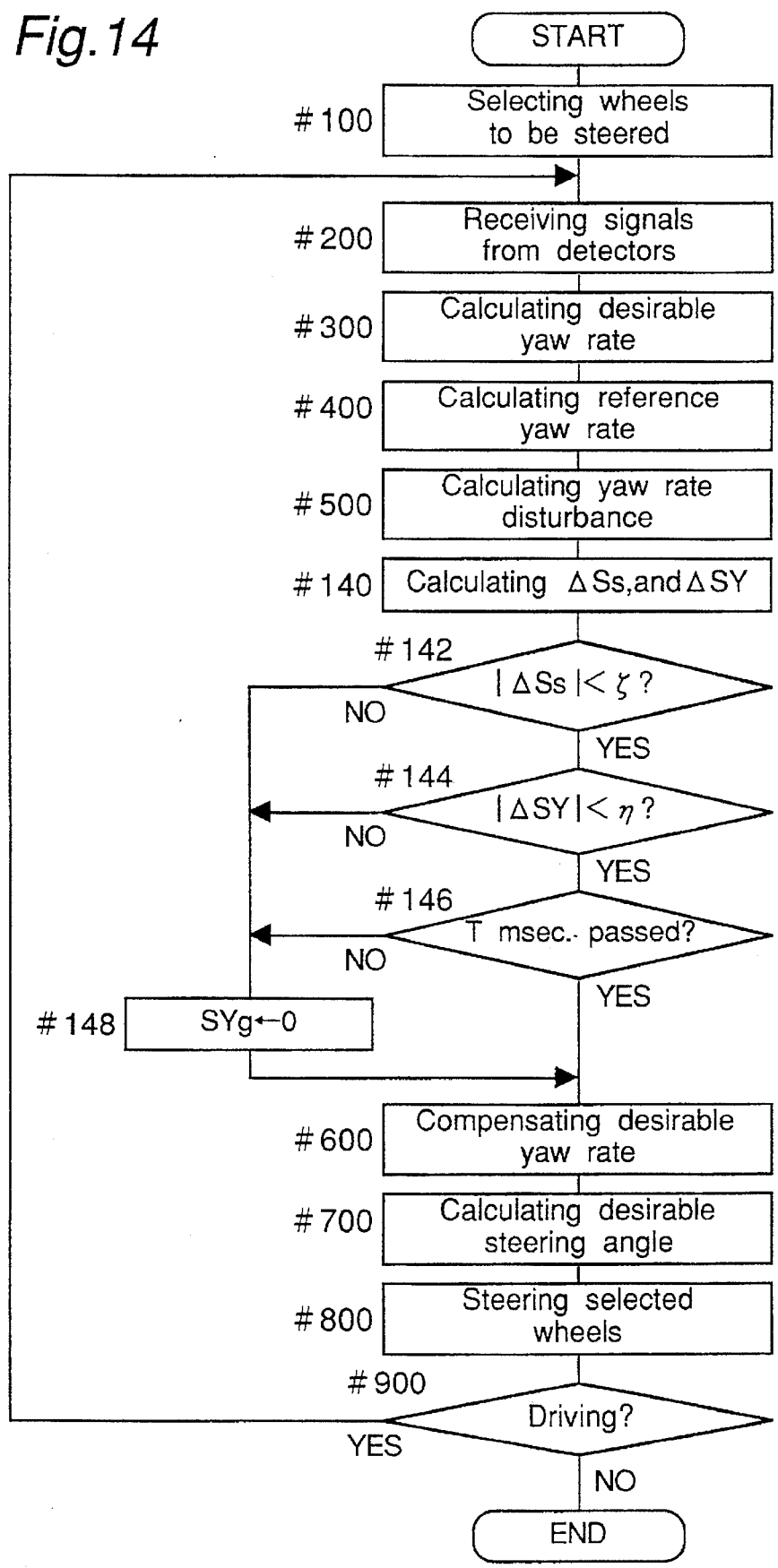
FIG. 14 is a flow chart showing an operation of the steering angle control apparatus of FIG. 13.

With reference to FIG. 14, the operation of the steering angle control apparatus according to this embodiment is described. Specifically, steps #140, #142, #144, #146, and #148 are additionally inserted between the steps #500 and #600 of the flaw chart shown in FIG. 2.

At step #140, the changing rate of the steering angle signal Ss and the detected yaw rate signal SY are obtained according to the equations (15) and (16).

At next step #142, it is judged whether the changing rate of steering angle signal Ss is smaller than a predetermined value $\zeta$, for example 6 deg/sec, or not. When $|\Delta Ss| \leq \zeta$, it is judged "NO" meaning that the yaw rate Y is effected by the sudden or shaky yaw rate disturbance. Then, the procedure advances to step #148.

At step #148, instead of the current yaw rate disturbance signal Syg, the second yaw rate disturbance signal Syg' having zero value is transferred from the compensation precentor 92 to the desirable yaw rate compensator 15. Then, the procedure advances to the next step #600 where the desirable yaw rate signal SYm is compensated with respect to the second yaw rate disturbance signal Syg' having zero value. With respect to this second yaw rate disturbance signal Syg', the desirable yaw rate signal Sym is compensated. As a result, the compensated desirable signal Syc equal to signal Sym can be obtained, because "Yg" in the equation (10) is zero.

However, when it is judged "YES" at step #142 meaning the steady yaw rate disturbance, the procedure advances to step #144.

At step #144, it is judged whether the changing rate of detected yaw rate signal SY is smaller than a predetermined value $\eta$, for example 25 deg/sec$^2$, or not. When $|\Delta SY| < \eta$, it is judged "NO" meaning that the yaw rate Y is effected by the sudden or shaky disturbance. Then, the procedure advances to the step #148. However, when it is judged "YES" (steady disturbance), the procedure advances to step #146.

At step #146, it is judged whether a predetermined period T, for example 200 msec, has passed since or not. When it is judged "NO" meaning that the steering wheel is turned so rapidly or dangerously, the procedure advances to step #148. However, when it is judged "YES" meaning that the steering wheel is turned moderately, the fourth discrimination signal Sd4 indicative of steady disturbance or moderately steering is transferred from the fourth yaw rate disturbance discriminator 91 to the compensation precentor 92. Then, the procedure advances to the next step #600 where desirable yaw rate signal Sym is compensated with respect to the current yaw rate disturbance signal Syg.

According to this embodiment, when the sudden or shaky disturbance or rapid (dangerous) turning of the steering wheel is detected, the compensation of the desirable yaw rate Ym by the compensator 15 is prevented. The wheels 19 or 29 are steered based on this non-compensated desirable yaw rate signal Ym.

Eighth embodiment

Figure 15:
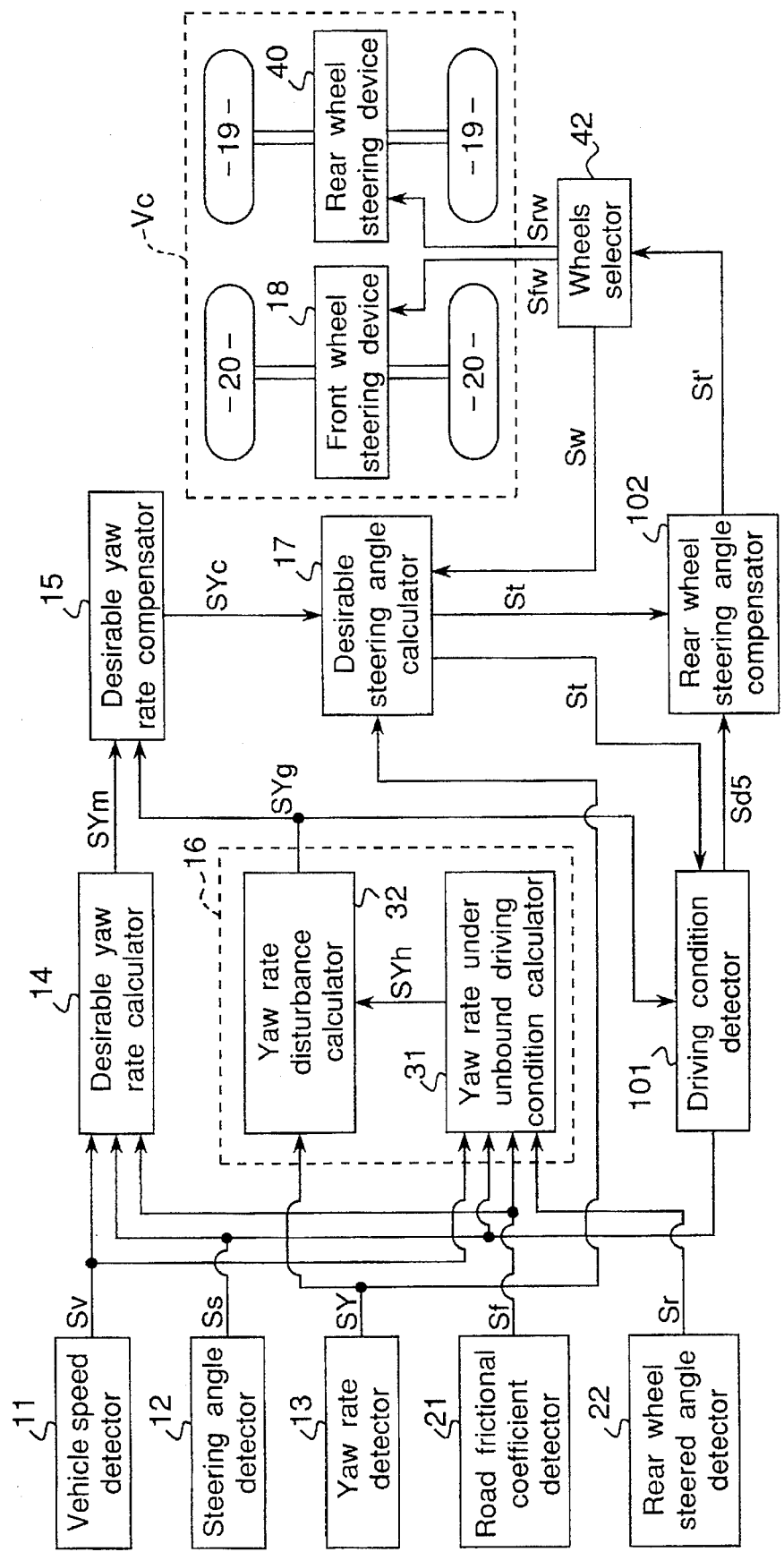
FIG. 15 is a block diagram showing a steering angle control apparatus according to a eighth embodiment of the present invention.

Referring to FIG. 15, other alternation of the steering angle control apparatus of FIG. 1 is shown. According to this embodiment, a driving condition detector 101 and a rear wheel steering angle compensator 102 are additionally provided. The driving condition detector 101 is connected to the steering angle detector 12, yaw rate disturbance calculator 32, and desirable steering angle calculator 17 for receiving the steering angle signal Ss, yaw rate disturbance signal Syg, and desirable steering angle signal St therefrom, respectively. Based on these signals Ss, Syg, and St, the driving condition detector 101 judges whether the vehicle Vc is about to drive out from the banked road or not, and produces a driving condition signal Sd5 indicative of the judging result.

The rear wheel steering angle compensator 102 is inserted between the desirable steering angle calculator 17, and is further connected to the driving condition detector 101 for receiving the signals St and Sd5 from the calculator 17 and detector 101, respectively. With respect to the signal Sd5, the rear wheel steering angle compensator 102 compensates the desirable steering angle signal St to produce and transfer a compensated desirable steering angle signal St' to the wheels selector 42.

Figure 16:
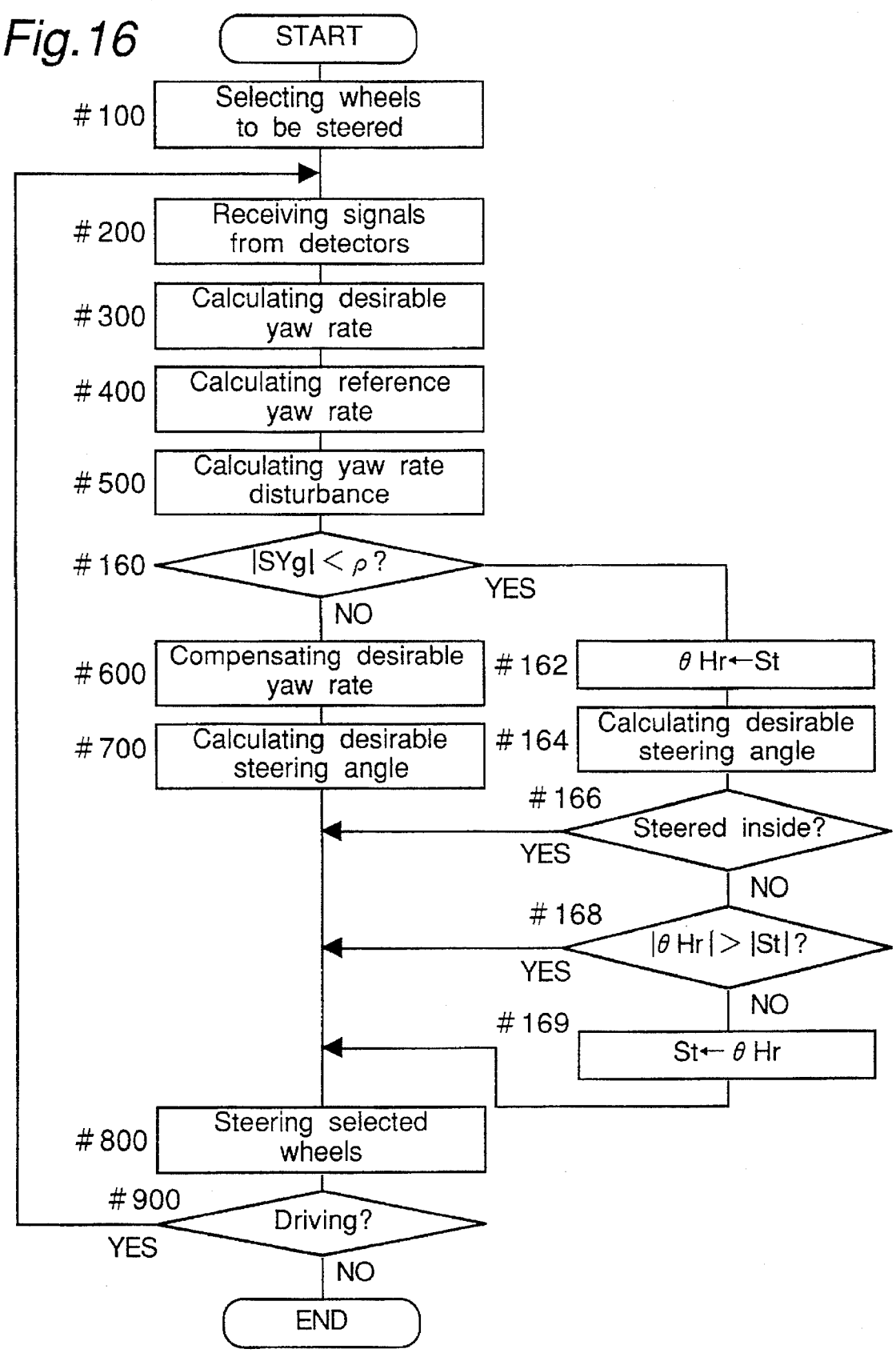
FIG. 16 is a flow chart showing an operation of the steering angle control apparatus of FIG. 15.

With reference to FIG. 16, the operation of the steering angle control apparatus according to this embodiment is described. Specifically, step #160 is added between steps #500 and #600 of the flaw chart shown in FIG. 2. Furthermore, steps #162, #164, #166, #168, and #169 from the added step #160 and converging to the step #800 are provided. #160, it is judged whether the changing rate of the yaw rate disturbance Yg is greater than a predetermined value ρ, for example 0.5 deg/sec, or not. When |ΔSygl≦ρ, it is judged "NO" meaning that the vehicle Vc are still driving on the banked road. Then, the procedure advances to the step #600 where the desirable yaw rate signal Sym is compensated.

However, when it is judged "YES" at step #160 meaning the vehicle Vc is about to move out from the banked road, the driving condition signal Sd5 is produced and transferred from the detector 101 to the rear wheel steering angle compensator 102. Then, the procedure advances to the step #162.

At step #162, the rear wheel steering angle θr of the desirable steering angle signal St which is obtained by the desirable steering angle calculator 17 (at step #164 in the previous control cycle) is stored as a stored rear wheel angle θHr in the detector 101. Then, the procedure advances step #164.

At step #164, the desirable steering angle signal St in the current control cycle is produced by the calculator 17, and is transferred to the driving condition detector 101. The procedure advances to step At step #166, it is judged whether the steering wheel is turned toward the direction in which the vehicle Vc moves in a curved line or not. When it judged "YES" meaning that the vehicle Vc is steered inside to move in a curved course, the procedure advances to the step #800 where the selected wheels 19 or 29 are steered according to the selection made at step #100.

However, when it is judged "NO" at step #166 meaning that the vehicle Vc is steered outside to move apart from the curved course, the procedure advances to step #168.

At step #168, it is judged whether the stored rear wheel angle θHr is greater than the desirable steering angle St obtained at step #164 or not. When it is judged "YES" meaning that the vehicle Vc is steered to move in a further curved course, the procedure advances to step #800. However, when the vehicle Vc is steered to move in a less curved course, it is judge "NO", and the procedure advances to step #169.

At step #169, the rear wheel steering angle compensator 102 compensates the steering angle signal St by replacing the rear wheel angle θr of thereof with the stored rear wheel angle θHr and produces the compensated desirable steering angle signal St'. Then, the procedure advances to step #800 where the steering angle signals Sfw and Srw are produced based on the compensated signal St' by the wheels selector 43.

According to this embodiment, when the sudden or shaky disturbance or rapid (dangerous) turning of the steering wheel is detected, the compensation of the desirable yaw rate Ym by the compensator 15 is prevented. The wheels 19 or 29 are steered based on this non-compensated desirable yaw rate signal Ym.

Ninth embodiment

Figure 17:
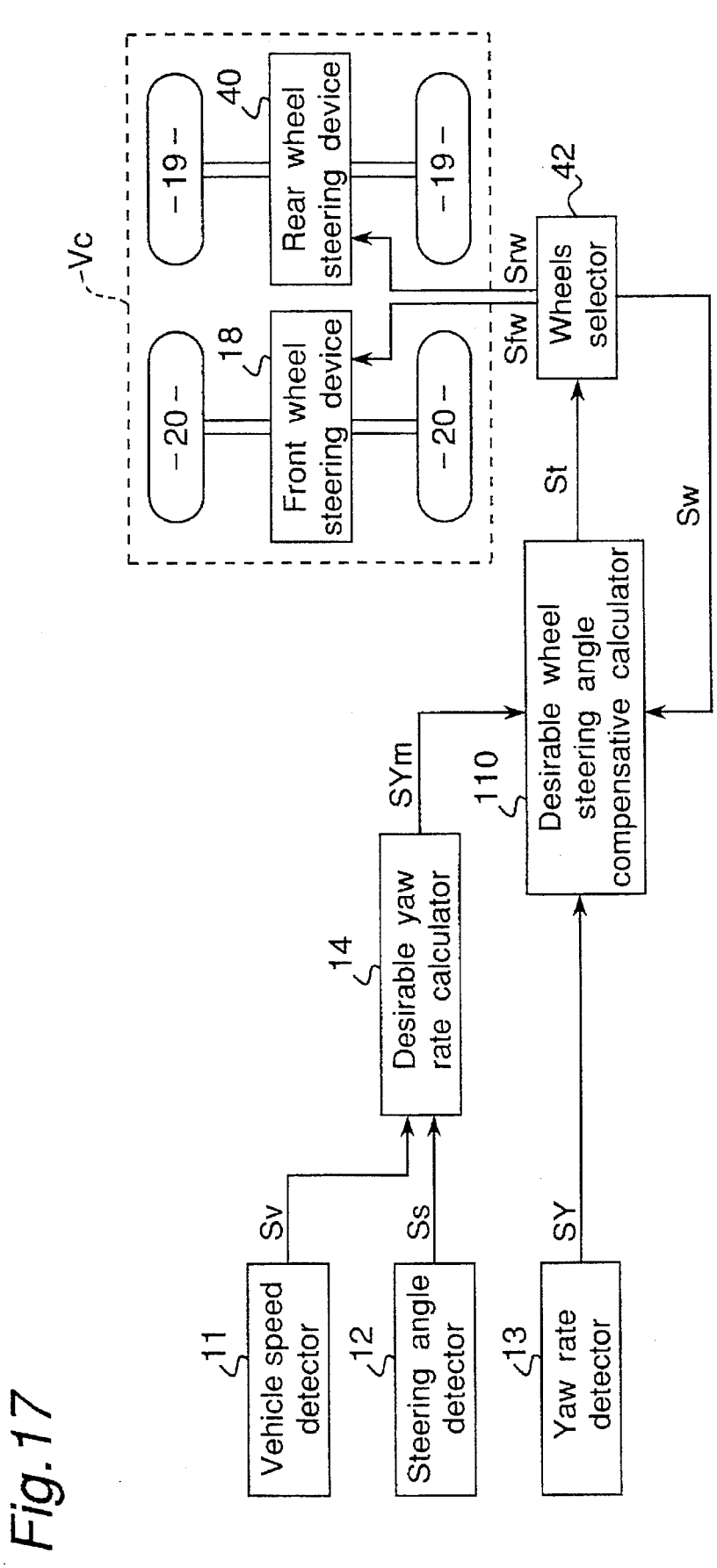
FIG. 17 is a block diagram showing a steering angle control apparatus according to a ninth embodiment of the present invention.

Referring to FIG. 17, an alternation of the steering angle control apparatus of FIG. 3 is shown. According to this embodiment, a desirable yaw rate compensator 15, yaw rate disturbance calculator 32, yaw rate under unbound driving condition calculator 31, and desirable steering angle calculator 17 in FIG. 3 are replaced by a desirable rear wheel steering angle compensative calculator 110. The desirable rear wheel steering angle compensative calculator 110 is connected to the yaw rate detector 13, the desirable yaw rate calculator 14, and wheels selector 42 to produce the desirable steering signal St based on the signals SY, Sym, and Sw. The calculator 110 is further connected to the wheels selector 42 for transferring the signal St thereto.

Figure 20:
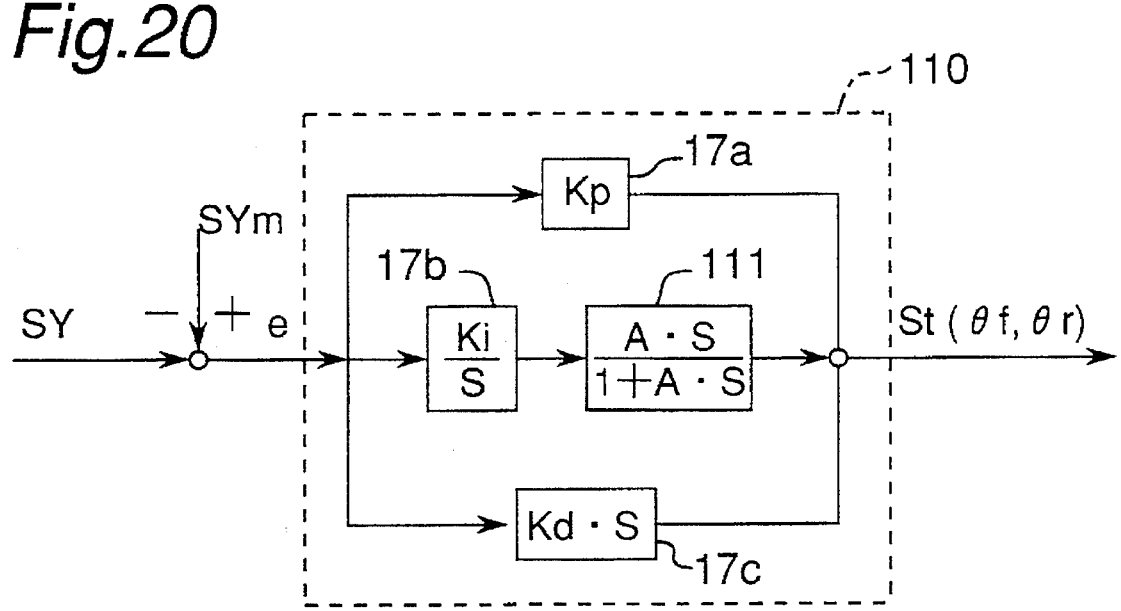
FIG. 20 is a block diagram showing the desirable rear wheel steering angle calculator of FIG. 17, FIGS. 21A, 21B, and 21C are illustrations in assistance of explaining the forces applied to the vehicle which is traveling on the road with various surface conditions.

Referring to FIG. 20, a construction of the desirable steering angle compensative calculator 110, similar to that of the calculator 17 shown in FIG. 19, is shown. The calculator 110 additionally includes a high pass filer 111 after the second multiplier 17b, as shown in FIG. 20.

Figure 18:
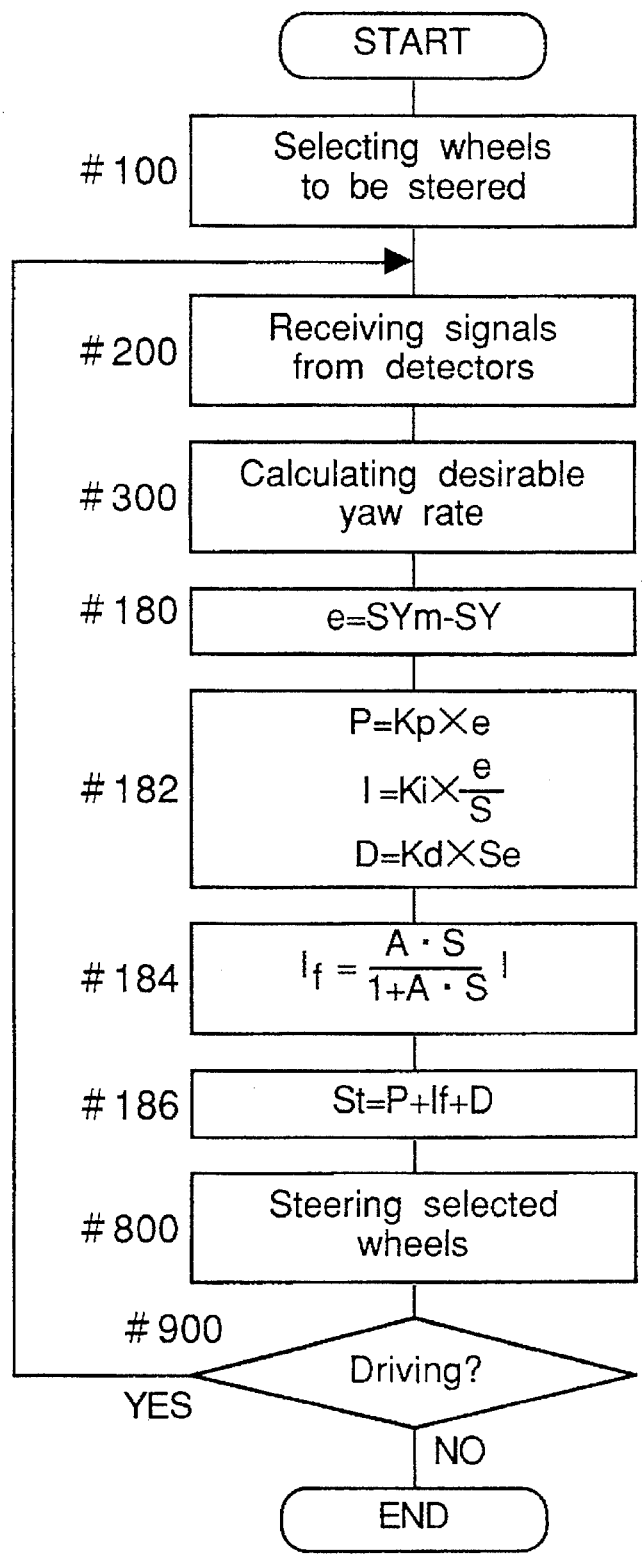
FIG. 18 is a flow chart showing an operation of the steering angle control apparatus of FIG. 17.

With reference to FIG. 18, the operation of the steering angle control apparatus according to this embodiment is described. Specifically, steps #300, #400, #500, #600, and #700 of the flaw chart shown in FIG. 2 are replaced by steps #180, #182, #184, and #186.

At step #180, "e=Sym−SY" is calculated.

At step #182, the calculations according to PID control method are performed, and each of values expressed by equations P=Kp·e, I=Ki·e/S, and D=Kd·S·e, respectively, is obtained.

At step #184, compensating factor If is obtained" is obtained.

At step 186, the steering angle signal St which additionally including the compensating factor If, when compared with the signal St obtained by the desirable steering angle calculator 17 according to the other embodiments.

It is to be noted that all the calculators, compensators, and the selectors for performing the operations described by the flow charts can be constructed by a micro computer.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A steering angle control apparatus for controlling steering angles of front wheels and rear wheels of a vehicle, said apparatus comprising:

a yaw rate detection means for detecting a detected yaw rate occurring in said vehicle;

a first yaw rate estimation means for estimating a desired yaw rate for causing said vehicle to drive stably;

a second yaw rate estimation means for estimating an ideal yaw rate of said vehicle for assuming an ideal driving condition;

a disturbance estimation means for estimating a yaw rate disturbance which causes said detected yaw rate to deviate from said ideal yaw rate;

a yaw rate compensation means for compensating said desired yaw rate based on said yaw rate disturbance to produce a compensated desired yaw rate; and steering angle control means for controlling said steering angles based on said compensated desired yaw rate.

2. A steering angle control apparatus as claimed in claim 1, further comprising:

a vehicle speed detection means for detecting the speed of said vehicle; and a steering angle detection means for detecting the steering angle of said front wheels, said first yaw rate estimation means estimating said desired yaw rate based on said detected speed and said detected steering angle, and said disturbance estimation means determining said yaw rate disturbance based on said ideal yaw rate and said detected yaw rate.

3. A steering angle control apparatus as claimed in claim 1, further comprising a steering means for steering said front and rear wheels based on said compensated desired yaw rate and said detected yaw rate.

4. A steering angle control apparatus as claimed in claim 3, further comprising a steering angle determination means for determining first and second steering angles at which said steering means steers said front and rear wheels, respectively.

5. A steering angle control apparatus as claimed in claim 4, further comprising a selection means selectively producing either one of said first and second steering angles.

6. A steering angle control apparatus as claimed in claim 2, wherein said second yaw rate estimation means is for estimating said ideal yaw rate based on said detected speed and said detected steering angle, a road frictional coefficient and a rear wheel steered angle.

7. A steering angle control apparatus as claimed in claim 6, further comprising a judging means for judging whether said yaw rate disturbance is being caused steadily or unsteadily, based on said detected yaw rate and said estimated ideal yaw rate; and a first compensation prevention means for preventing said yaw rate compensation means from compensating said desired yaw rate when said first judging means judges that said yaw rate disturbance is being caused unsteadily.

8. A steering angle control apparatus as claimed in claim 4, further comprising a judging means judging whether said yaw rate disturbance is being caused steadily or unsteadily based on said estimated yaw rate disturbance; and a compensation prevention means for preventing said yaw rate compensation means from compensating said desired yaw rate when said judging means judges that said yaw rate disturbance is being caused unsteadily.

9. A steering angle control apparatus as claimed in claim 2, further comprising a judging means for judging whether or not any of said steering angle detection means, said yaw rate detection means, and said disturbance estimation means has a fault, based on said detected steering angle, said detected yaw rate, and said detected yaw rate disturbance; and a compensation prevention means for preventing said yaw rate compensation means from compensating said desired yaw rate when said judging means judges that any of said steering angle detection means, said yaw rate detection means, and said disturbance estimation means has a fault.

10. A steering angle control apparatus as claimed in claim 2, further comprising a judging means for judging whether or not any of said steering angle detection means, said yaw rate detection means, and said disturbance estimation means has a fault, based on said estimated yaw rate disturbance; and a compensation prevention means for preventing said yaw rate compensation means from compensating said desired yaw rate when said judging means judges that any of said steering angle detection means, said yaw rate detection means, and said disturbance estimation means has a fault.

11. A steering angle control apparatus as claimed in claim 2, further comprising a judging means for judging whether or not said vehicle is under an emergency circumstance, based on said detected steering angle and said detected yaw rate;

a compensation prevention means for preventing said yaw rate compensation means from compensating said desired yaw rate when said judging means judges that said vehicle is under an emergency circumstance.

12. A steering angle control apparatus as claimed in claim 4, further comprising a judging means for judging whether or not said vehicle is about to move out from a banked road, based on said detected first steering angle and said second steering angle; and a compensation prevention means for preventing said steering angle determination means from determining said second steering angle based on said compensated desired yaw rate.

13. A steering angle control apparatus for controlling the steering angles of front wheels and rear wheels of a vehicle, said apparatus comprising:

a yaw rate detection means for detecting a detected yaw rate occurring in said vehicle;

a first yaw rate estimation means for estimating a desired yaw rate for causing said vehicle to drive stably;

a second yaw rate estimation means for estimating an ideal yaw rate of said vehicle assuming an ideal driving condition;

a disturbance estimation means for estimating a yaw rate disturbance which causes said detected yaw rate to deviate from said ideal yaw rate;

yaw rate compensation means for compensating said desired yaw rate based on said yaw rate disturbance to produce a compensated desired yaw rate; and a steering means steering said front and rear wheels; and a steering angle determination means for determining first and second steering angles at which said steering means steers said front and rear wheels, respectively, based on said compensated desired yaw rate.

* * * * *